(12) United States Patent
Smith et al.

(10) Patent No.: US 7,610,182 B2
(45) Date of Patent: Oct. 27, 2009

(54) IMAGE DISPLAY APPARATUS, METHOD AND PROGRAM BASED ON RIGID BODY DYNAMICS

(75) Inventors: Russell Leigh Smith, Mountain View, CA (US); Lacoursiere Claude, Montreal (CA)

(73) Assignee: Electronic Arts, Inc., Redwood City, CA (US)

( * ) Notice: Subject to any disclaimer, the term of this patent is extended or adjusted under 35 U.S.C. 154(b) by 458 days.

(21) Appl. No.: 10/221,051

(22) PCT Filed: Mar. 9, 2001

(86) PCT No.: PCT/GB01/01020

§ 371 (c)(1),
(2), (4) Date: Dec. 24, 2002

(87) PCT Pub. No.: WO01/67310

PCT Pub. Date: Sep. 13, 2001

(65) Prior Publication Data

US 2003/0179205 A1    Sep. 25, 2003

(30) Foreign Application Priority Data

Mar. 10, 2000  (GB) ................................. 0005750.5

(51) Int. Cl.
*G06F 17/10* (2006.01)
*G06G 7/48* (2006.01)

(52) U.S. Cl. ............................................. 703/2; 703/7
(58) Field of Classification Search ...................... 703/2, 703/7
See application file for complete search history.

(56) References Cited

OTHER PUBLICATIONS

Baraff; Coping with friction for non-penetrating rigid body simulation; Computer Graphics; 1991; pp. 31-40.*

Mihai Anitescu, et al., "*Time-Stepping for Three-Dimensional Rigid Body Dynamics*," Computer Methods in Applied Mechanics and Engineering, Jul. 20, 1999, Netherlands, vol. 177, No. 3-4, pp. 183-197, p. 184, last paragraph, p. 188, paragraph 3.

David E. Stewart, "*Convergence of a Time-Stepping Scheme for Rigid-Body Dynamics and Resolution of Painleve's Program*", Archive for Rational Mechanics and Analysis, 1998, Germany, vol. 145, No. 3, pp. 215-260, p. 215, line 1—p. 217, last paragraph, p. 222, paragraph 3—p. 223, last paragraph.

Y.H. Chen, "*Equations of Motion of Constrained Mechanical Systems: Given Force Depends on Constraint Force*," Mechatronics, Great Britain, Jun. 1999, vol. 9, No. 4, pp. 411-428.

* cited by examiner

*Primary Examiner*—Hugh Jones
(74) *Attorney, Agent, or Firm*—Philip H. Albert; Townsend and Townsend and Crew LLP

(57) ABSTRACT

An image display system and method that use physical models to produce a realistic display of a scene are disclosed. The image display method involves operating a computer having a display screen, a memory and a processing unit for simulating the motion of objects and displaying the results on the display screen. The method includes the steps of storing in the memory position and velocity parameters which define an initial state of a model system having a plurality of bodies, storing in the memory parameters which define at least one constraint function constraining the motion of the bodies in the model system, and calculating in the processor the position and velocity parameters which define the state of the system after a predetermined time step based on rigid body dynamics, including carrying out a semi-implicit integration step subject to the constraints, to determine the velocity after the step, including determining the constraint forces that act to keep the system in compliance with the constraints by ensuring that the first derivative of the constraint function is zero.

41 Claims, 7 Drawing Sheets

IMAGE DISPLAY APPARATUS, METHOD AND PROGRAM BASED ON RIGID BODY DYNAMICS

BACKGROUND OF THE INVENTION

The invention relates to an image display system and method, and in particular to an image display system that uses physical dynamic models to produce a realistic display of a scene.

It is becoming increasingly useful to display scenes on computer displays that represent the real world. Such scenes may occur in virtual reality devices, simulators and computer games.

One way of providing such scenes is to film images and to display the recorded images on the display. However, this approach requires that the content of the scene is predetermined and appropriate film sequences created and pre-stored in the computer. Thus, such an approach cannot be used where the scenes are not wholly scripted, which makes the approach unsuitable for simulations and computer games in which the user can carry out actions not predicted by the programmer.

An alternative approach uses a simulation of rigid body dynamics to allow scenes including such objects to be displayed realistically. In order to cope with simulation applications, the model has to be able to cope with a variable number of simulated objects that can be created and destroyed.

Such models should model a plurality of rigid objects that can interact with each other, subject to constraints. For example, if one object is hinged to another object that hinge acts as a constraint; the two objects cannot move independently. The existence of constraints makes the problem much more difficult to solve than a simple application of Newton's laws of motion.

A number of prior approaches have been presented but these have not proven wholly successful. The most suitable for simulation of multiple objects are so-called "extended coordinate methods" in which the constraints are introduced using Lagrange multipliers that correspond to forces that maintain the constraints. However, there are difficulties with these approaches.

Firstly, the known methods use a large number of variables, using nearly doubling the number of variables (because of the Lagrange multipliers) to describe the system, which results in them being eight times more computationally intensive than an equivalent system without constraints. Thus, the prior art methods tend to be highly inefficient.

Secondly, the known methods use differential algebraic equations that are numerically rather stiff. Simple methods for solving such equations are rather unstable.

Thirdly, it is not known how to efficiently incorporate friction into such systems. As will be appreciated, friction is an important property of real physical systems that has to be modelled correctly for a realistic result. This is a difficult problem but a working solution was reported in D. E. Stewart and J. C. Trinkle, "An implicit time-stepping scheme for rigid body dynamics with inelastic collisions and coulomb friction", International for numerical methods in engineering, volume 39 pages 2673-2691 (1996), and was improved on by Mihai Anitescu and F. A. Potra, "Formulating dynamic multi-rigid-body contact problems with friction as solvable linear complementarity problems", Non-linear Dynamics, volume 14 pages 231-237 (1997). The approach described allows consistent models in which the velocities can always be computed and are always finite. The disadvantage of the approach is that the model involves solving a particular class of linear complementarity problem which has a structure such that not all algorithms are suitable. Anitescu and Trinkle used the Lemke algorithm but this is inefficient and prone to large errors.

A fourth difficulty with prior art approaches is that the constraints are generated automatically; such constraints need not be not independent of one another which results in the system being degenerate. Geometric analysis software that performs collision detection cannot check whether all the constraints are truly independent of each other, and only during simulation can it be determined that some constraints are redundant. Such degeneracy can cause real problems for the simulations, especially in the case of collision detection which checks for proximity of pairs of objects, whereas the constraint degeneracy only appears at the system level including all the rigid bodies in the system.

Fifthly, known systems do not cope well with stiffness, i.e. rigid spring-like systems and compliant elements. The only tractable solutions ignore contact and friction altogether, which makes them unsuitable for analysis of arbitrary physical systems.

Accordingly, there is a need for an image display system that ameliorates or alleviates some or all of these difficulties.

The known models require the solution of linear complementarity problems, a particular type of constrained equation. In general, a linear complementarity problem can be put in the form:

$$Mz + q = w \tag{1}$$

$$z_i \geq 0 \; \forall i \in \{1, 2 \ldots n\} \tag{2}$$

$$w_i \geq 0 \; \forall i \in \{1, 2 \ldots n\} \tag{3}$$

$$z_i w_i = 0 \; \forall i \in \{1, 2 \ldots n\} \tag{4}$$

where M is an n by n matrix and z and w are real n-dimensional vectors. The problem requires finding the solution of equation (1), i.e. the values of z and w, subject to the constraints (2)-(4).

This is fundamentally a combinatorial problems, and solutions generally search through two index sets, where each index is in one of the sets. The first set a is a set of active variables for which $w_i = 0$ and the second set $\beta$ is a set of free variables for which $z_i = 0$. The problem is then partitioned as $$\begin{bmatrix} M_{\alpha\alpha} & M_{\alpha\beta} \\ M_{\beta\alpha} & M_{\beta\beta} \end{bmatrix} \begin{bmatrix} z_\alpha \\ 0 \end{bmatrix} + \begin{bmatrix} q_\alpha \\ q_\beta \end{bmatrix} = \begin{bmatrix} 0 \\ w_\beta \end{bmatrix} \tag{5}$$

where $\alpha$ and $\beta$ specify indices in the first and second sets respectively.

This is equivalent to the linear algebra problem $$M_{\alpha\alpha} z_\alpha = -q_\alpha$$

$$w_\beta = M_{\beta\alpha} z_\alpha + q \tag{6}$$

which must be solved for z while w is calculated by substitution. $M_{\alpha\alpha}$ is known as the principal submatrix.

Various implementations are known. They differ in how the two sets are revised. They use a computed complementarity point which is a vector s such that $$s_i = \begin{cases} z_i & \forall i \in \alpha \\ w_i & \forall i \in \beta \end{cases} \quad (7)$$

The methods go through a sequence of sets until a solution is found, i.e. until $s_i \geq 0 \ \forall i \in \{1, 2 \ldots n\}$ The Murty principal pivoting algorithm is known from Murty and Yu: "Linear Complementarily, Linear and Non Linear programming" available at www.personal.engin.umich.edu/~murty/book/LCPbook/index.html, and also in an earlier edition published by Helderman-Verlag, Heidelberg (1988), the content of which is incorporated into this specification by reference.

The indices are assigned to a set, and i is set to zero. Then, the principal submatrix $M_{\alpha\alpha}$ is formed and solved for z using equation (6).

Then $s^{(i)} = z_\alpha + w_\beta$ is calculated, where $$w_\beta = M_{\beta\alpha} z_\alpha \quad (8)$$

If $s \geq 0$ then the algorithm has found a solution. Otherwise, the smallest index j for which the corresponding element of s is found. If this index is in the first set, the index is moved to the second, otherwise the index is in the second set in which case it is moved to the first set. The loop parameter i is incremented and the loop restarted until a solution is found.

The method is illustrated in the flow chart of FIG. 1.

The method is stateless and can be started from any initial guess for the division of the indices into first and second sets. The matrix will work on any P matrix and in particular on any positive definite matrix.

The method can fail where the matrix is positive semi-definite. Such matrices arise in real physical systems, and can be made positive definite by adding a small amount to each element along the diagonal. Kostreva in "Generalisation of Murty's direct algorithm to linear and convex quadratic programming", Journal of optimisation theory and applications, Vol. 62 pp 63-76 (1989) demonstrated how to solve such positive semi-definite problems. Basically, the problem is solved for an initial value of $\epsilon$, $\epsilon$ is then reduced until the solutions converge; if the solutions diverge the problem is unfeasible.

BRIEF SUMMARY OF THE INVENTION

According to the invention, there is provided a method, a computer program recorded on a data carrier (e.g. a magnetic or optical disc, a solid-state memory device such as a PROM, an EPROM or an EEPROM, a cartridge for a gaming console or another device), for controlling a computer (e.g. a general purpose micro, mini or mainframe computer, a gaming console or another device) having a display screen, a memory and a processing unit, the computer program being operable to control the computer to carry out the method, and a computer programmed to carry out the method.

The method according to the invention may include the steps of:
   storing in a memory position and velocity parameters defining an initial state of a model system having a plurality of bodies,
   storing in the memory parameters defining at least one constraint function constraining the motion of the bodies in the model system, and
   calculating in the processor the position and velocity parameters defining the state of the system after a predetermined time step based on rigid body dynamics, including
   carrying out a semi-implicit integration step subject to the constraints, to determine the velocity after the step, including
   determining the constraint forces that act to keep the system in compliance with the constraints by ensuring that the first derivative of the constraint function is zero.

In known approaches, the second derivative was held to be zero. However, the method according to the invention provides much faster calculation.

The method may cause the computer to carry out the further step of displaying an image of the objects at their calculated positions on the computer display screen, so that the display shows the objects on the screen using physical laws to simulate their motion.

The means for determining the constraint forces may include solving the linear complementarity problem using the Murty algorithm.

The calculating step may include carrying out the implicit integration by
   calculating the velocity parameters after the time step from the external forces, the constraint forces and the position and velocity parameters before the time step, and
   calculating the position parameters after the time step from the external forces and constraint forces, the calculated velocity parameters after the time step and the position parameters before the time step; and In prior art image display methods implementing rigid body dynamics the accelerations have been taken as parameters. In the method according to the invention, the parameters calculated are position and velocity.

The means for solving the linear complementarity problem may include solving the boxed LCP problem by the modified Murty's method.

In order to implement maximum bounds on the constraint forces the calculation may include the step of testing whether the constraint forces have a magnitude greater than a predetermined value and if so setting them to be that predetermined value. This has not previously been done but leads to a more efficient solution.

Preferably, the model includes a model of friction. Static friction requires that the tangential force $f_t$ of magnitude less than or equal to the static friction coefficient $\mu_s$ times the normal force $f_n$. The force $f_t$ due to dynamic friction has a magnitude equal to the dynamic friction coefficient $\mu_s$ times the normal force, and a direction given by $f_t v_t \leq 0$.

The dependence of the frictional force on the normal force can be replaced by a novel approximation in which the friction, dynamic or static, is not dependent on the normal force. This force then corresponds to a simple bounded multiplier, i.e. a force that can have up to a predetermined value. Thus the force exactly fits the model used in any event in which the constraint forces Lagrange multipliers have maximum values; friction in the model is equivalent to another bounded constraint force. Thus making this approximation substantially simplifies the inclusion of friction in the model.

Accordingly, the method may include a model of friction in which the frictional force between a pair of objects is independent of the normal force between the objects.

The frictional force between each pair of objects may be modelled as a bounded constraint force in which the constraint force acts in the plane of contact between the pair of objects to prevent sliding of one of the pair of objects over the other of the pair, wherein the constraint force is bounded to be not greater than a predetermined constant value to allow sliding of the objects over one another and thus include dynamic friction in the simulation.

In order to implement bounded constraint forces, the method may include the step of testing whether the constraint forces have a magnitude greater than a predetermined value and if so setting them to be that predetermined value.

The method may include a relaxation parameter y introduced to determine how exactly to satisfy the constraints.

The friction model taken leads to a symmetric positive definite linear complementarity problem, in which the only friction conditions are simple inequalities. This allows the use of the much more efficient Murty algorithm that the less useful Lemke algorithm.

From further aspects, this invention provides a computer program that is a computer game program, which game program may be recorded within a cartridge for a computer game machine; and a computer game programmed to generate a display by means of a computer program according to any preceding claim.

BRIEF DESCRIPTION OF THE DRAWINGS

Specific embodiments of the invention will now be described, purely by way of example, with reference to the accompanying drawings in which.

DETAILED DESCRIPTION OF THE INVENTION

Figure 1:
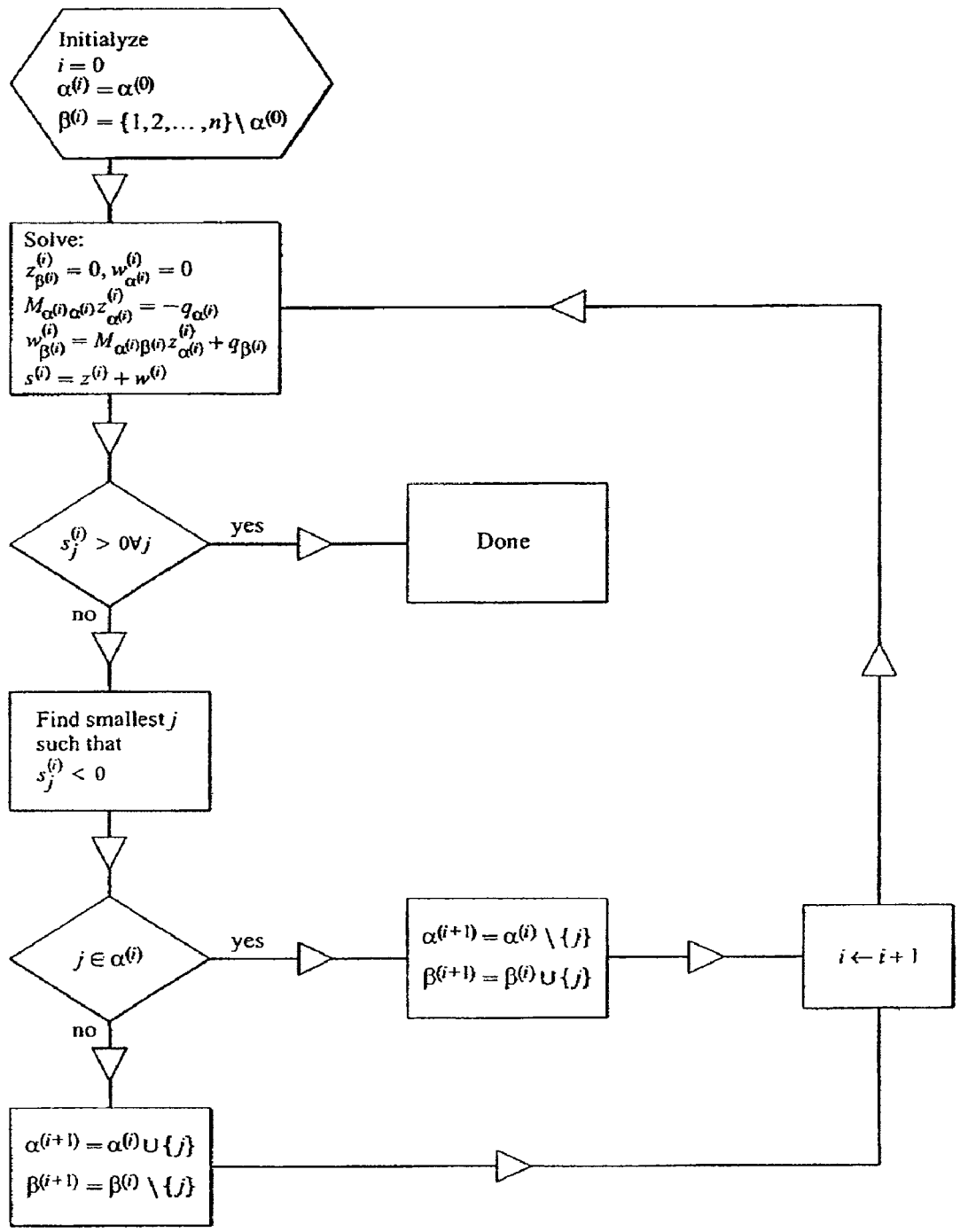
FIG. 1 shows a flow diagram of a prior art implementation of the Murty algorithm.
Figure 2:
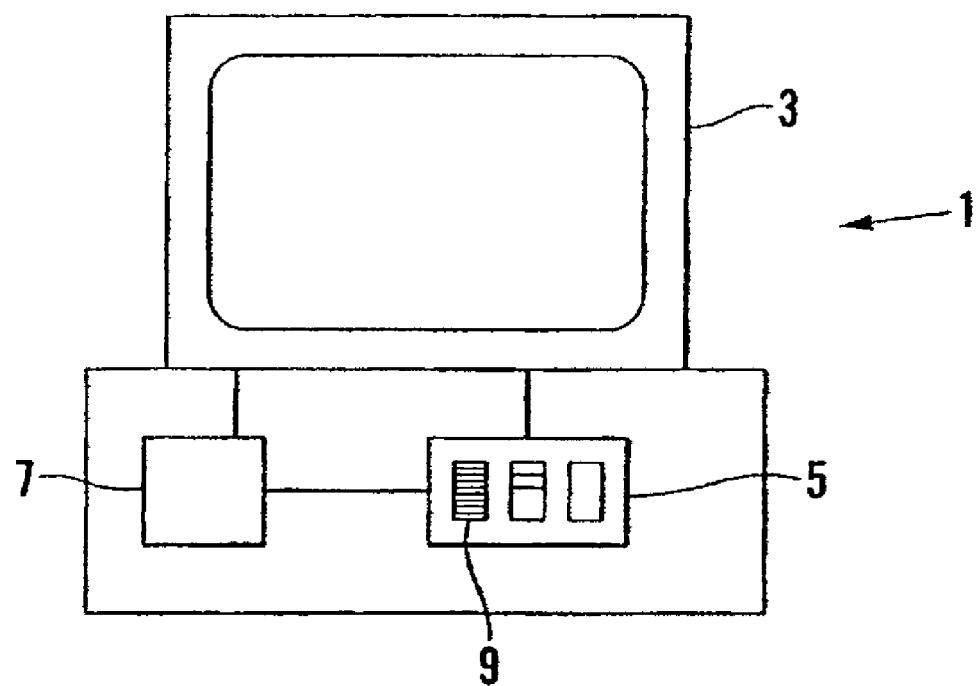
FIG. 2 shows a computer running the present invention.

The implementation of the invention that will be described includes a computer system 1 having a display 3, a memory 5 and a processor. The computer system has software 9 loaded into the computer memory to allow the computer system to display a simulation of the real physical world on the display 3. The display 3 may be a conventional computer display screen, for example an Liquid Crystal Display (LCD) screen or a Cathode Ray Tube (CRT) screen, or the display 3 may be a less conventional display type such as virtual reality goggles or multiple screens of a coin operated video game, of the type installed in public places.

A physical system which has n rigid bodies is modelled. The $i^{th}$ body has a mass $m_i$, and a position vector p which has s seven coordinates, three to define the position of the rigid body and four being the Euler parameters of the body defining its orientation. Each body also has velocity vector v which has six coordinates, three being the three components of linear velocity and three being the three components of angular velocity, each relative to the inertial frame. Further details about the coordinates and the matrices used to convert between coordinates in the local reference frame and those in an inertial frame are given in sections 1 to 1.4 of Appendix 1.

The key point to note is that equations 1.36 and 1.37 of Appendix 1 define Newton's laws for a dynamical system in a form similar to equation (1), i.e.

$$M\dot{v}=f_e+f_c+f_r \qquad (9)$$

where M is the block diagonal matrix defined in equation 1.37 of appendix 1.

A rigid body dynamics problem then becomes equivalent to solving equation (7) subject to the dynamic constraints. This is carried out by numerical integration. The difficult part is calculating the constraint force.

The initial state of the system is set up in the computer memory, and includes the above parameters.

Constraints governing the rigid bodies may also be set up. The software 9 may include definitions of such constraints. An example of a constraint is a hinge between two rigid body elements so that the elements cannot move independently, the system contains constraint initialization routines for setting up such constraints. A separate routine is provided for each type of constraint; the routine is called, defining the one, two or three constrained elements and other information required to specify the constraint. For example, if there are two constrained elements in the form of two rigid bodies are joined by a ball and socket joint, the information required is the identity of the constrained elements and the position of the ball and socket joint. The constraint information is stored in the form of the Jacobian of constraint.

A simple example of a constraint would be a rigid floor at height zero in the model. The constraint function $\Phi(p_x, p_y, p_z)$ is then chosen to be $\Phi(p)=p_z$, the conventional constraint $\Phi(p)\geq 0$ then being a definition of the constraint.

The solution method used requires a Jacobian J of the constraint function $\Phi(p)$—this is related to the more conventional Jacobian $J_p$ of the function $\Phi(p)$ with respect to position by $J=J_pQ$ where Q is defined at equation 1.40 of Appendix 1.

The method used does not require storing the second derivative of the constraint function.

After the initial conditions and constraints are set up, the routine may be called to simply step forward in time by a predetermined time period. Indeed, the use of this simple program structure in which a routine is called with a matrix and outputs a like matrix of the results one time step forward is a significant advantage over prior approaches in which the movement forward in time has not been encapsulated in this way.

The way in which the system moves one step forward is based on simple Euler integration, i.e. calculating the final positions and velocities from the initial positions and velocities and the applied forces. Of course, some of the forces are the constraint forces that ensure that the system remains in accordance with the constraints; the way these are calculated will be described below.

Euler integration can be explicit, in which the integration is based on the values at the start of the step, or implicit in which the values at the end of the step are used. In the method of the invention, a semi-implicit approach is used in which the positions after the step are calculated using the positions at the start of the step and the velocities at the end of the step and the velocities are calculated explicitly. Put mathematically, the position p and velocity v at the $(i+1)^{th}$ step after a time h are given by $$p_{i+1}=p_i+hv_{i+1} \qquad (10)$$

$$v_{i+1}=v_i+h\cdot M^{-1}\cdot f \qquad (11)$$

where M is the block diagonal matrix defined in Appendix 1 and f is the sum of the forces on the system, including the constraint forces to maintain the constraint. Note that the equations for the position variables are implicit and the equation for velocity explicit. Thus, the above equations need to be solved subject to the constraint equations.

Of course, in order to carry out the above calculation it is necessary to calculate f. The force f is made up of the external force plus the effects of the external torques plus the constraint force that keeps the system in accordance with the constraints. Thus, the constraint forces on the system must be calculated. Appendix 1 at 1.51 demonstrates how to do this for an explicit Euler scheme to calculate subject to the constraint $\Phi(p)=0$. In the conventional scheme, the constraints are calculated by setting the second derivative of $\Phi$ to zero.

In the method according to the embodiment, however, this is not done and the first derivative $$\frac{\partial \Phi}{\partial p}$$

is set to zero.

The detail is set out in sections 1.5 to 1.6 of Appendix 1. The approach of using the velocity constraints rather than the second derivative of the constraint function has both advantages and disadvantage. The key disadvantage is that although this approach guarantees that the velocity constraints are satisfied it does not guarantee that the position constraints are.

The constraint equation may be given by $$\phi_o + J_p(p'-p)=0 \qquad (12)$$

where Jp is the Jacobian of the constraint forces based on the position, i.e.

$$J_p = \frac{\partial \Phi}{\partial p}.$$

This is related to the J actually calculated by $J=J_p Q$.

Rather than satisfy this exactly, the parameter $\gamma$ is introduced by amending the right hand side of equation (12) so that it reads $$\phi_o + J_p(P'-p)=(1-\gamma)\phi_o \qquad (13).$$

When $\gamma=1$ equation (13) becomes equivalent to equation (12). A value of 0.2 has been found suitable.

A solution for the forces is given at 1.5.5. of Appendix 1. The result is:

$$(J.M^{-1}J^T)\lambda = \frac{-\gamma\phi_0}{h^2} - \frac{Jv}{h} - JM^{-1}(f_c+f_r) \qquad (14)$$

This is an equation in the form $Ax+b=w$ and it can be solved by the algorithm presented below to find the vector $\gamma$. The constraint force fc is then given by $$f_c = J^T \lambda. \qquad (15)$$

The constraint forces may then be fed into the integration step to compute the position of each object after the timestep.

It should be noted that the method uses bounded constraints. In other words, each element of the force is not allowed to become arbitrarily large as in previous methods but is bounded. This is simply implemented by testing to see if the elements of the force are larger than the bound and if so reducing the element to the bound.

The problem posed is not directly amenable to simple solution by the Murty algorithm. Rather, it has the slightly different structure of a boxed linear complementarity problem, as follows:

$$Az+q=w_+-w_-$$

$$z_i-1_i \geq 0$$

$$w_{+i} \geq 0$$

$$(z_i-1_i)w_{+i}=0$$

$$(u_i-z_i) \geq 0$$

$$w_{-i} \geq 0$$

$$(u_i-z_i)w_{-i}=0 \qquad (16)$$

The $w_+$ and $w_-$ terms come from the integration step; they correspond to forces/accelerations from upper and lower boundaries respectively, the positions of the boundaries being given by u and 1. The z term corresponds to the differential of the velocity.

The result gives the constraint force which can be plugged into the integration.

The above formalism is equivalent to a mixed complementarity problem defined as $$\begin{bmatrix} A & -I & I \\ I & 0 & 0 \\ -I & 0 & 0 \end{bmatrix} \begin{bmatrix} z \\ w_+ \\ w_- \end{bmatrix} + \begin{bmatrix} q \\ -l \\ u \end{bmatrix} = \begin{bmatrix} 0 \\ \mu \\ v \end{bmatrix}. \qquad (17)$$

This can be solved by partitioning the second set defined above into two sets, $\gamma$ and $\iota$, so that $z_j=1_j$ for $j\in\gamma$ and $Z_j=U_j$ for $j\in\iota$. Afterwards, the Murty algorithm is followed with a different definition of the complementarity point, namely, $$s_j = \begin{cases} \min(z_j - l_j, u_j - z_j) & \forall j \in \alpha \\ (A_{\gamma\alpha}z_\alpha - A_{\gamma\gamma}l_\gamma - A_{\gamma\iota}u_\iota + q_\gamma) & \forall j \in \gamma \\ -(A_{\iota\alpha}z_\alpha - A_{\iota\gamma}l_\gamma - A_{\iota\iota}u_\iota + q_\iota) & \forall j \in \iota \end{cases} \qquad (18)$$

The least index rule is applied to the complementarity point as follows:

$$j=\min \arg(s_j<0)$$

If $j\in\alpha$ and $z_j<1_j$ then remove j from $\alpha$ and put it in $\gamma$ If $j\in\alpha$ and $z_j>u_j$ then remove j from $\alpha$ and put it in $\iota$ If $j\in\gamma$ add j to $\alpha$ and remove it from $\gamma$ If $j\in\iota$ add j to $\alpha$ and remove it from $\iota$ The loop is then repeated until there is no element $S_j<0$.

Figure 3:
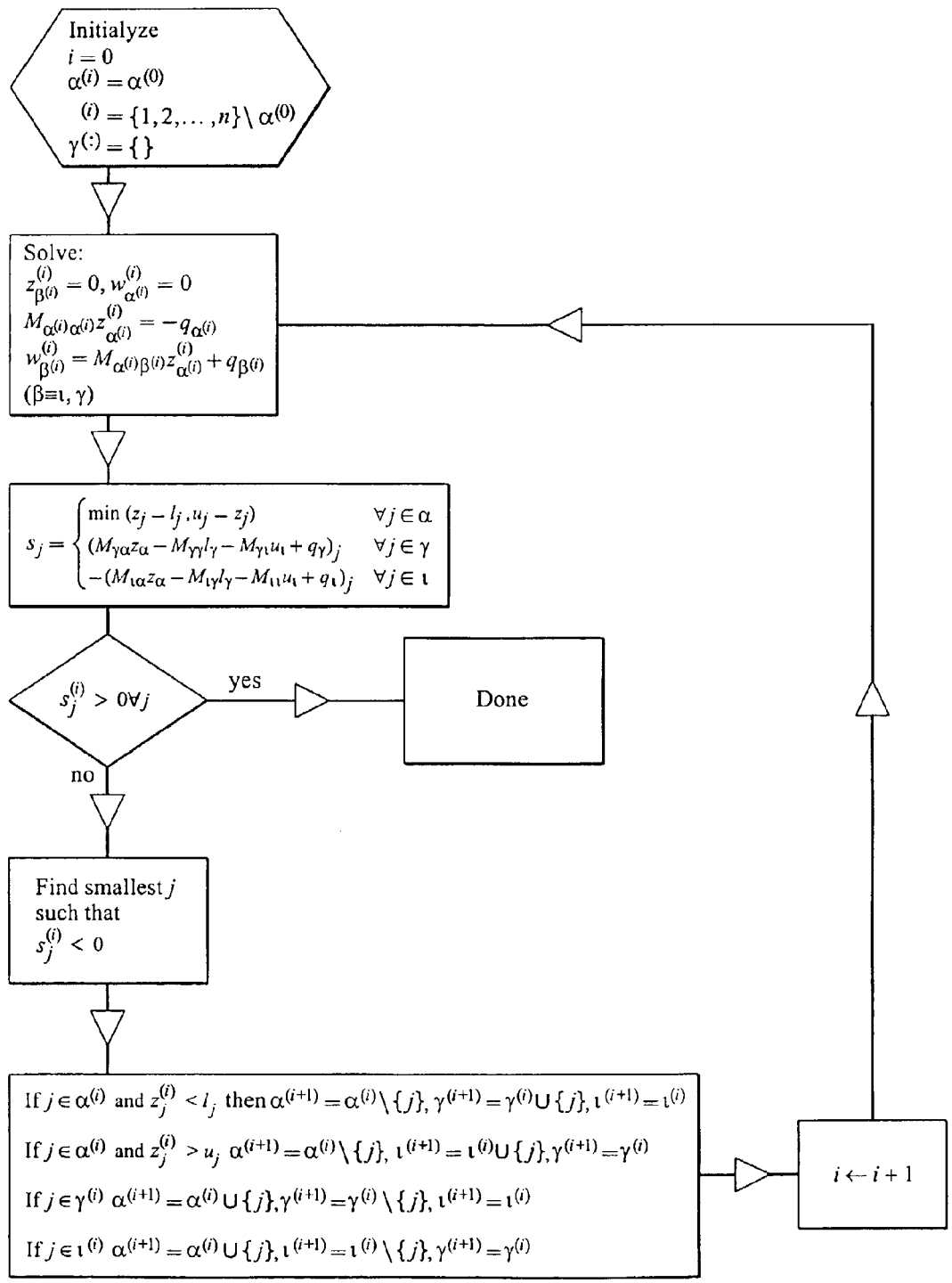
FIG. 3 shows a flow diagram of the implementation of the present invention.

FIG. 3 sets out a flow chart of the Murty algorithm that is used to model the constraints. It is based on that of FIG. 1, with amendments to cope with the bounded parameters which are may be used to model friction.

This solution will be referred to as the Boxed LCP solution, which has been developed independently by the inventors.

The above solution may be refined by replacing the zeroes with a tolerance parameter $-\epsilon$. This is similar to the Kostreva method, except here the parameter is not reduced but simply kept at a constant value say $10^{-3}$.

The parameters γ and ε may be chosen to model a compliant coupling between two of the rigid bodies. In this way springs and compliant bodies may be included in the model without any complexity.

Appendix 4 sets out how the parameters ε and γ already present in the model can be used to model stiff springs. Such parameters are very useful for modelling car suspensions, and the like. Thus, the use of the model provides the unexpected benefit of being usable not merely to ensure fitting of the constraints but can also be used to model stiff springs without any additional parameters or programming.

A key advantage provided by the approach selected is that it allows the inclusion of friction.

Figure 4:
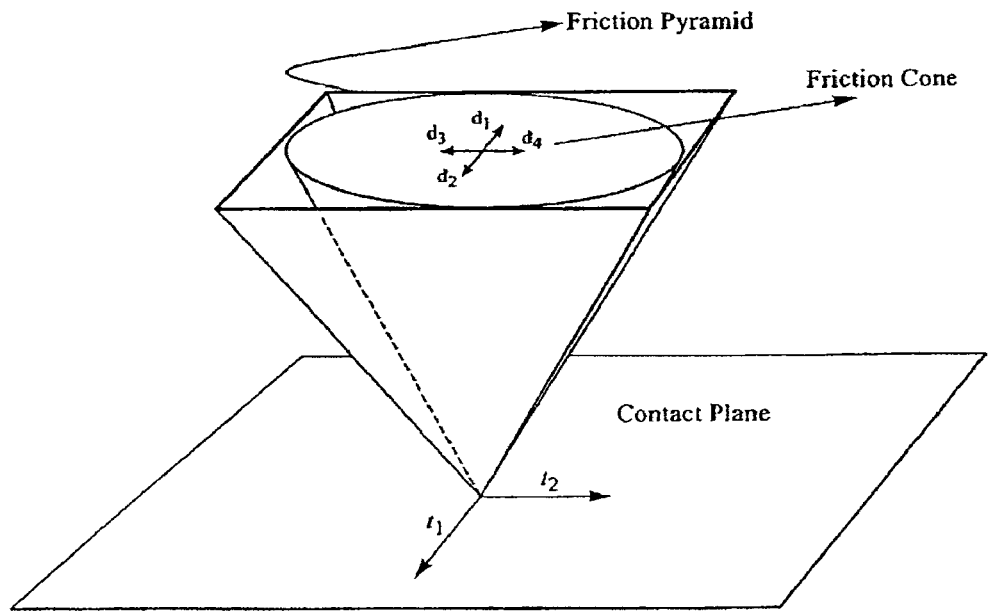
FIG. 4 shows the friction pyramid.
Figure 5:
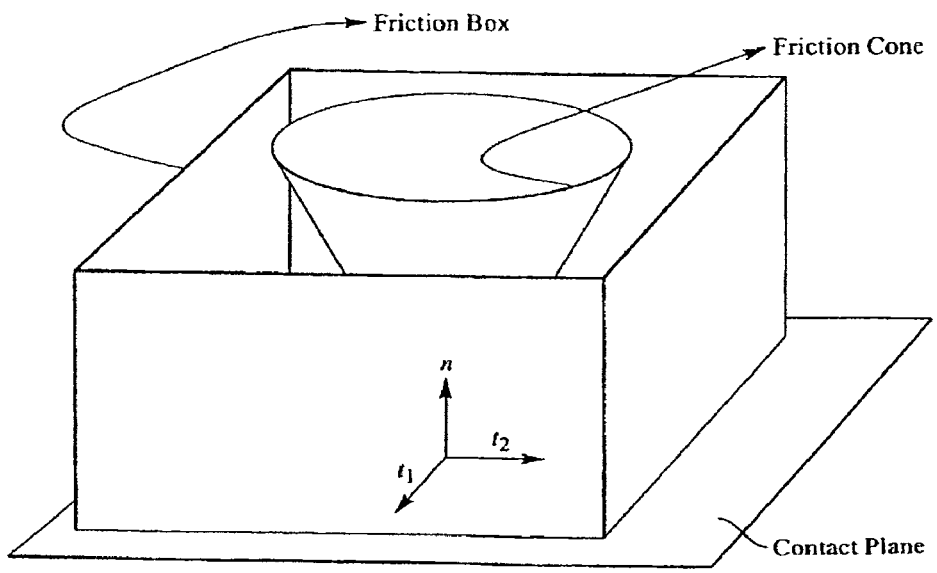
FIG. 5 shows the box-friction model used to approximate to the friction pyramid.

The friction constraint can thus be considered to be given by a cone which; if the contact force between two bodies is given by a force vector the values of the dynamic friction when the bodies slide is given by a cone in the three dimensional space of the force (FIG. 4). In the invention this cone is approximated by a four sided box, in other words friction is approximated by a model in which the transverse frictional force is not dependent on the normal force (FIG. 5).

The method thus works as follows:

Step 1: For each contact point, apply a non-penetration constraint and a static friction constraint.

Step 2: Estimate a normal force $\lambda_i$ for each point

Step 3: At each point of contact, limit the Lagrange multipliers that enforce zero relative velocity to have a maximum value proportional to the normal force: i.e.

$$-\mu\lambda_i \leq \beta_{ij} \leq \mu\lambda_i$$

Step 4: solve with the boxed Murty algorithm

Step 5: refine estimate of normal forces and repeat if required.

Figure 6:
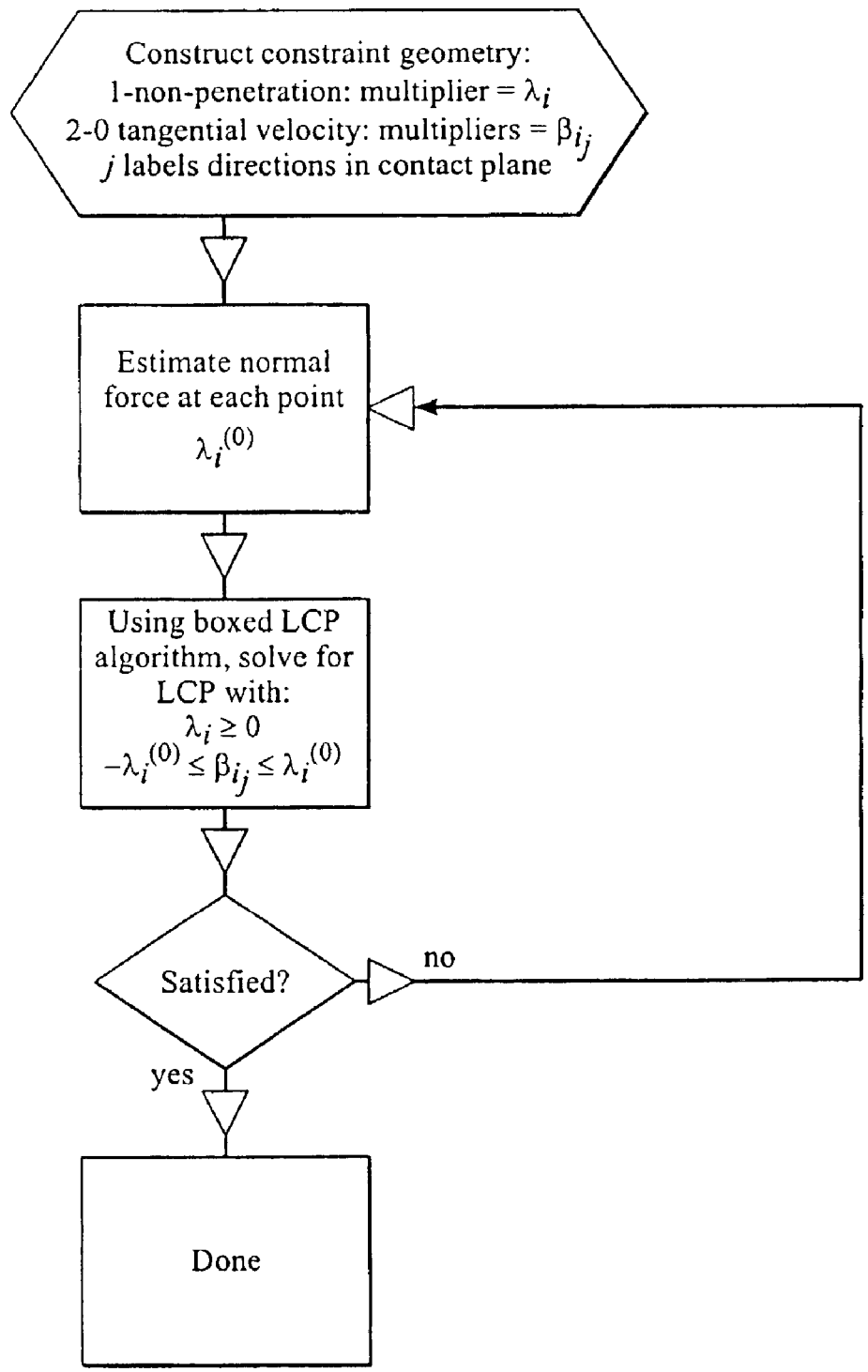
FIG. 6 is a flow chart of the method including friction.

A flow chart of this procedure is presented in FIG. 6.

Surprisingly, such a crude model still gives good realistic results. The real advantage is that the model does not involve a combination of the Lagrange multipliers (constraint forces) as a constraint—the constraints are of the simple form $f_t \leq a$ constant, whereas for more realistic model the upper bound on $f_t$ would depend on the normal force. This allows the use of a simpler algorithm as set out above. Indeed, the bounded constraint force has exactly the same bounded force as used for all of the constraints on the objects; accordingly adding friction does not add significantly to the difficulty of solving the problem.

Thus, the described embodiment allows much faster processing of the simulation.

A list of the routines used in the program implementing the embodiment, including the many routines to set up individual types of constraint, is provided in Appendix 2.

Figure 7:
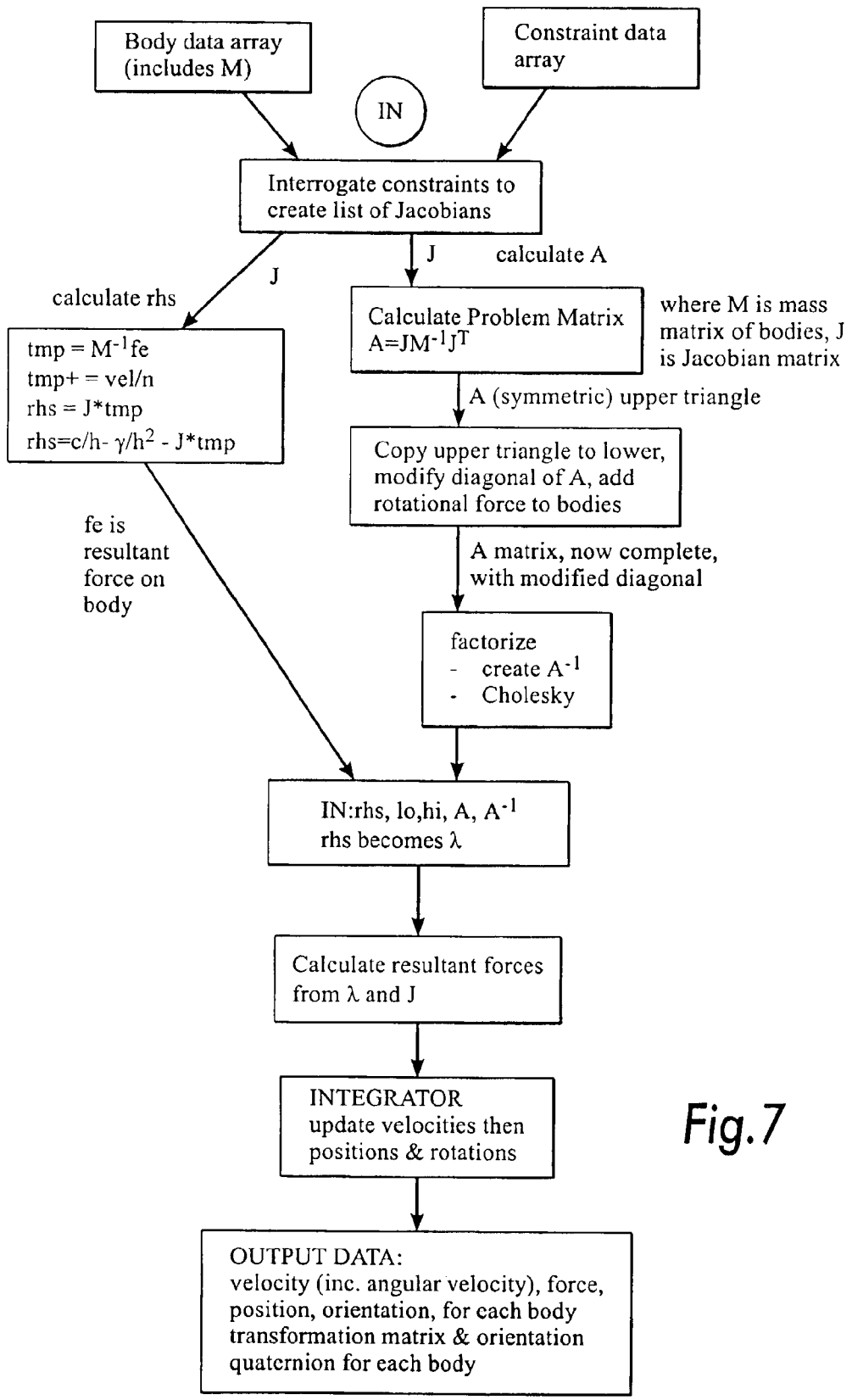
FIG. 7 is a flow chart of the program according to the invention.

The program implementing the above is schematically shown in FIG. 7.

Firstly, a body data array containing the information about each rigid object, i.e. its position, orientation and mass is initialized. A constraint data array is likewise initialized containing parameters defining the constraints.

In the next step, the constraint data array is interrogated to create a list of Jacobians.

Then, a matrix A is calculated given by $A = JM^{-1}J^T$ where M is the mass matrix as defined in Appendix 1 and J is the Jacobian. This step is done so that A is an upper triangle matrix (and symmetric).

The upper triangle elements of A are then copied to the lower, and the diagonal modified. Rotational force may be added to the bodies at this stage. The A matrix is then complete.

Next, A is factorized to find $A^{-1}$ by Cholesky deposition.

An intermediate result rhs is then calculated as follows: Calculation of rhs, for each body:

tmp=0 tmp=$M^{-1} \cdot f_e$ tmp=tmp+$v/h$ rhs=$c/h - \gamma/h^2 - J \cdot$tmp

Then, rhs, A, $A^{-1}$ and the lower and upper constraint vectors l and u are sent to a routine which calculates λ, the Lagrange multipliers, by solving equation (16) by these parameters by the boxed LCD method as described above.

Next, the resultant forces are calculated from λ and J, and the results passed to the semi-implicit integrator.

This outputs the velocity, force, position and orientation, in the form of the transformation matrix and orientation quaternion of each body.

Finally, a screen image is calculated displaying the objects in their new locations and this is displayed on the video display unit.

The method described works much faster than previously known methods. Accordingly, it becomes possible to more accurately simulate real time scenes, and provide an improved simulation that more rapidly and accurately simulates the real physical world.

APPENDIX 1

1 Rigid Body Dynamics 1.1 Definitions

Acronyms
  COM: Center of mass.
  IF: Inertial frame of reference for the whole system.

Notation α (any 3×1 vector) is relative to the IF.
  a' is relative to the coordinate system of some rigid body. a and a' are related by a unitary (rotational) transformation.
  $I_i$ is the identity matrix of size i×i.
  $0_i$ is the zero matrix of size i×i.
  If a and b are 3×1 vectors then $$a \times b = \hat{a} b \tag{1.1}$$

where $$\hat{a} = \begin{bmatrix} 0 & -a_3 & a_2 \\ a_3 & 0 & -a_1 \\ -a_2 & a_1 & 0 \end{bmatrix} \Rightarrow \hat{a} a = 0 \tag{1.2}$$

$$\frac{d}{dp} F(p) \equiv \nabla_p F(p) \tag{1.3}$$

1.2 Parameters of the Mechanical System

There are n rigid bodies ("links") numbered 1 . . . n. The coordinate system for each body has its origin at its center of mass.

Link i has mass $m_i$ and 3×3 body-relative inertia tensor $H_i$.

There are m constraint equations.

p (7n×1) is the system position vector, which has the structure $$p = [p_1 p_2 \ldots p_n]^T$$

where $$p_i = [x_i y_i z_i q_i^1 q_i^2 q_i^3 q_i^3]^T \quad (1.5)$$

where $(x,y,z)$ is the position of the center of mass and $(q^1, q^2, q^3, q^4)$ is the orientation quaternion (Euter parameters). These are both relative to the IF.

v (6n×1) is the system velocity vector, which has the structure $$v = [v_1 v_2 \ldots v_n]^T \quad (1.6)$$

where $$v_i = [\dot{x}_i \dot{y}_i \dot{z}_i \dot{\omega}_i^1 \dot{\omega}_i^2 \dot{\omega}_i^3]^T \quad (1.7)$$

where $(\dot{x}, \dot{y}, \dot{z})$ is the velocity of the center of mass and $(\omega^1 \omega^2 \omega^3)$ is the angular velocity (both relative to the IF).

$R_i$ is the 3×3 unitary rotation matrix corresponding to the Euler parameters for body i.

$$R = \begin{bmatrix} q^1 q^1 + q^2 q^2 - q^3 q^3 - q^4 q^4 & 2q^2 q^3 - 2q^1 q^4 & 2q^1 q^3 + 2q^2 q^4 \\ 2q^2 q^3 + 2q^1 q^4 & q^1 q^1 - q^2 q^2 + q^3 q^3 - q^4 q^4 & -2q^1 q^2 + 2q^3 q^4 \\ -2q^1 q^3 + 2q^2 q^4 & 2q^1 q^2 + 2q^3 q^4 & q^1 q^1 - q^2 q^2 - q^3 q^3 - q^4 q^4 \end{bmatrix} \quad (1.8)$$

Force vectors (such as $f_e$, the external force) have the structure $$f = [f_1 f_2 \ldots f_n]^T \quad (1.9)$$

where $$f_i = [f_i^x f_i^y f_i^z T_i^x T_i^y T_i^z]^T \quad (1.10)$$

where $(f^x, f^y, f^z)$ is the force applied to center of mass and $(T^x, T^y, T^z)$ is the applied torque (both relative to the IF).

1.3 Equations of Motion for One Rigid Body

1.3.1 Coordinate Transformation

R is the unitary transformation matrix for link i (3×3). If a is a point in the IF and a' is a point in the link frame then $a = Ra'$. Also note that $$R^{-1} = R^T \quad (1.11)$$

The ith column vector of R is $u_i$, so that $$R = \begin{bmatrix} \dot{u}_1 & \dot{u}_2 & \dot{u}_3 \end{bmatrix} \quad (1.12)$$

The $u_i$ vectors are axis unit vectors for the body.

1.3.2 Rotating Frame

If a is an IF point in the body relative to the center of mass then $$\dot{a} = \omega \times a \quad (1.13)$$

Thus $$\dot{R} = [\dot{u}_1 \dot{u}_2 \dot{u}_3] \quad (1.14)$$

$$= [\omega \times u_1 \omega \times u_2 \omega \times u_3] \quad (1.15)$$

$$= [\hat{\omega} u_1 \hat{\omega} u_2 \omega \times u_3] \quad (1.16)$$

$$= \hat{\omega} R \quad (1.17)$$

Note that $\hat{\omega} = \hat{\omega}^T$ and $\textcircled{\omega}\omega = 0$.

1.3.3 Angular Momentum

To start with we will consider just the rotational part of motion, and ignore the linear part (which is a lot easier to deal with). The definition of angular momentum L for a rigid body is $$L \equiv \sum_i q_i \times M_i \dot{q}_i \quad (1.18)$$

where $q_i$ are the positions of all particles in the rigid body (w. r. t. the IF) and $M_i$ are their masses. Now, $$\dot{L} = \sum_i \frac{d}{dt}(q_i \times M_i \dot{q}_i) \quad (1.19)$$

$$= \sum_i \dot{q}_i \times M_i \dot{q}_i + \sum_i q_i \times M_i \ddot{q}_i \quad (1.20)$$

$$= \sum_i q_i \times g_i \quad (1.21)$$

where $g_i$ is the force on particle i. Now, $$g_i \equiv \sum_{j \neq i} g_{ij} + G_i$$

where $g_{ij}$ is the force between $q_i$ and $q_j$, and $G_i$ is the external force on $q_i$. It can be shown that if $g_{ij} = -g_{ji}$ (as is the case according to Newton) then the total contribution to L from the $g_{ij}$ is zero, so $$\dot{L} \equiv \sum_i q_i \times G_i \quad (1.22)$$

Where the sum over i only includes those particle positions at which an external force is acting. Introducing the effect of torque is easy—all "pure" torques applied to the rigid body effectively works through the center of mass, so $$\dot{L} = \sum_i q_i \times G_i + \sum_i \tau_i \quad (1.23)$$

The quantity $\dot{L}$ is effectively the external rotational force applied to the body, which is usually a combination of joint constraint forces and forces external to the rigid body system.

1.3.4 The Link Between ω and L

It can be shown that $$L' = H\omega' \quad (1.24)$$

where $L = RL'$, $\omega = R\omega'$, and H is the 3×3 inertia tensor for this body. Thus $$R^T L = H R^T \omega \quad (1.25)$$

$$L = R H R^T \omega \quad (1.26)$$

from the chain rule $$\dot{L} = \frac{d}{dt}(RHR^T)\omega + RHR^T\dot{\omega} \quad (1.27)$$

$$= (\dot{R}HR^T\omega + RH\dot{R}^T\omega + RHR^T\dot{\omega}) \quad (1.28)$$

$$\dot{R}^T\omega = (\hat{\omega}R)^T\omega \quad (1.29)$$

$$= R^T\hat{\omega}^T\omega \quad (1.30)$$

$$= 0 \quad (1.31)$$

so $$RHR^T\dot{\omega} = \dot{L} - \dot{R}HR^T\omega \quad (1.32)$$

$$= \dot{L} - \hat{\omega}(RHR^T)\omega \quad (1.33)$$

$$= \dot{L} - \omega \times ((RHR^T)\omega) \quad (1.34)$$

or, schematically, (inertia tensor in IF)×(angular acceleration)=(external force)+(coriolis force) (1.35)

which is simply a statement of Newton's law.

1.4 Equations of Motion for a Rigid Body System

For n rigid bodies we simple combine the equations of motion into one matrix equation:

$$M\dot{v} = f_e + f_c + f_r \quad (1.36)$$

where M is a block diagonal matrix (with 3×3 blocks):

$$M = \begin{bmatrix} m_1 I_3 & & & & & & \\ & R_1 H_1 R_1^T & & & & & \\ & & m_2 I_3 & & & & \\ & & & R_2 H_2 R_2^T & & & \\ & & & & \ldots & & \\ & & & & & m_n I_3 & \\ & & & & & & R_n H_n R_n^T \end{bmatrix} \quad (1.37)$$

and $f_e$ is the external force (applied from "outside" the rigid body system), $f_c$ is an undetermined constraint force, and $f_r$ is the rotational force:

$$f_r = \begin{bmatrix} -\omega_1 \times ((R_1 H_1 R_1^T)\omega_1) \\ \vdots \\ -\omega_n \times ((R_n H_n R_n^T)\omega_n) \end{bmatrix} \quad (1.38)$$

The state variables of the system are p and v. To integrate the system, the state derivatives must be known. The above equation allows us to determine $\dot{v}$, assuming that $f_c$ is known). $\dot{p}$ is determined by applying a transformation that allows the angular velocity to be converted into Euler parameter derivatives $$\dot{p} = Qv \quad (1.39)$$

$$Q = \begin{bmatrix} I_3 & & & & & & \\ & D_1 & & & & & \\ & & I_3 & & & & \\ & & & D_2 & & & \\ & & & & \ldots & & \\ & & & & & I_3 & \\ & & & & & & D_n \end{bmatrix} \quad (1.40)$$

where $$D_i = 0.5 \begin{bmatrix} -q_i^2 - q_i^3 - q_i^4 \\ +q_i^1 + q_i^4 - q_i^3 \\ -q_i^4 - q_i^1 - q_i^2 \\ +q_i^3 - q_i^2 + q_i^1 \end{bmatrix} \quad (1.41)$$

Note that $D_i^T D_i = I_3/4$.

1.5 Integration with Implicit Constraint Projection

1.5.1 Explicit Euler

The explicit Euler integration step is new $p = p^* = p + hQv$ (1.42)

new $v = v^* = v + hM^{-1}(f_e + f_c + f_r)$ (1.43)

As the system evolves we want to compute $f_c$ such that the following constraint is satisfied:

$$\phi(p)=0 \qquad (1.44)$$

Note that $\phi(p)$ has size m×1. Make a first order approximation to this:

$$\phi(p) = \phi(p_0) + \frac{\partial \phi(p_0)}{\partial p}(p - p_0) + \ldots \qquad (1.45)$$

$$\approx \phi_0 + J_p(p - p_0) \qquad (1.46)$$

where $p_o$ is the current position, and $J_p$ is the m×7n Jacobian of the constraint function with respect to position (evaluated at $p_0$). Find the first derivative of $\phi$:

$$\dot\phi(p) = \frac{\partial \phi}{\partial p} \cdot \frac{\partial p}{\partial t} \qquad (1.47)$$

$$= J_p \dot p \qquad (1.48)$$

$$= J_p Q v \qquad (1.49)$$

$$= J v \qquad (1.50)$$

Where J is the Jacobian of the constraint function with respect to velocity ($J=J_pQ$). Find the second derivative of $\phi$:

$$\ddot\phi(p) = \frac{\partial}{\partial t}\frac{\partial \phi}{\partial p} \cdot \frac{\partial p}{\partial t} + \frac{\partial \phi}{\partial p} \cdot \frac{\partial}{\partial t}\frac{\partial p}{\partial t} \qquad (1.51)$$

$$= \frac{\partial}{\partial p}\frac{\partial \phi}{\partial p}\dot p \dot p + J_p \ddot p \qquad (1.52)$$

$$= \frac{\partial^2 \phi}{\partial p^2}\dot p \dot p + J\dot v \qquad (1.53)$$

$$= J\dot v - c \qquad (1.54)$$

$$\frac{\partial^2 \phi}{\partial p^2}$$

is a tensor quantity because $\phi$ is a vector.

Note that during simulation, J is the matrix that we actually calculate, not $J_p$. The constraint force $f_c$ is computed as $$f_c = J^T \lambda \qquad (1.55)$$

where $\lambda$ is a vector of Lagrange multipliers. This ensures that the minimal amount of work is done to enforce the constraints. Compute $f_c$ such that $\ddot\phi(p)$;

$$J\dot v = c \qquad (1.56)$$

$$JM^{-1}(f_c + J^T\lambda + f_r) = c \qquad (1.57)$$

$$JM^{-1}J^T\lambda = c - JM^{-1}(f_e + f_r) \qquad (1.58)$$

which gives $\lambda$, from which $f_c$ and $\dot v$ can be computed. Note that we can get the same result from solving $$\begin{bmatrix} M & J^T \\ J & 0 \end{bmatrix}\begin{bmatrix} \dot v \\ \lambda \end{bmatrix} = \begin{bmatrix} f_e + f_r \\ c \end{bmatrix} \qquad (1.59)$$

1.5.2 Implicit Euler

The implicit Euler integration step is $$p^* = p + hQ(p^*)v^* \qquad (1.60)$$

$$v^* = v + hM^{-1}(p^*)(f_e(p^*,v^*) + (f_c(p^*,v^*) + f_r(p^*,v^*)) \qquad (1.61)$$

where the dependence of the right hand sides on the new state is made obvious. Performing this fully implicit update is rather difficult, even when using low order Rosenbrock methods, for reasons explained later.

1.5.3 Velocity Projection Method

Instead of trying to satisfy the acceleration constraint ($\ddot\phi=0$) lets try to satisfy the velocity constraint ($\dot\phi=0$). From equation 1.50:

$$\dot\phi(p) = Jv = 0 \qquad (1.62)$$

Substitute the Euler velocity update (equation 1.43) into this, and solve for $\lambda$;

$$J(v + hM^{-1}(f_e + f_c + f_r)) = 0 \qquad (1.62)$$

$$(JM^{-1}J^T)\lambda = c - \frac{Jv}{h}JM^{-1}(f_e + f_r) \qquad (1.63)$$

which is similar to equation 1.58 except that the term $-Jv/h$ has replaced c. $f_c$ and the new state are computed as before. This equation ensures that the velocity constraints are met at the new state, which reduces constraint violation compared to equation 1.58. It also means we do not have to have a separate impulse application step—collision constraints for example will automatically result in a zero penetration velocity.

A further advantage is that the value c does not have to be computed for each constraint. Although this thing is relatively inexpensive to compute, it is annoying to derive.

1.5.4 Position Projection as a Separate Step

Extra work must be done in the velocity projection method to ensure that the constraints don't come apart, because although the velocity constraints are guaranteed to be satisfied at the new state, the position constraints may not be. One option is Baumgarte stabilization. Another is direct position projection. We start with $$\phi_0 + J_p(p - p_0) = 0 \qquad (1.65)$$

where $\phi_0$ and $J_p$ are re-evaluated at the new position. $J_p$ is usually not square so there are many possible p that satisfy this equation. We want to find the solution which minimizes $|p-p_0|$. This is done by setting $$P - P_0 = J_p^T \delta \qquad (1.66)$$

so that $$\phi_0 + J_p J_p^T \delta = 0 \qquad (1.67)$$

$$\delta = -(J_p J_p^{T-1}\phi_0) \qquad (1.68)$$

$$p \leftarrow p_0 - (J_p J_p^{T-1}\phi_0) \qquad (1.69)$$

This corresponds to one iteration of a Newton method to find the root of $\phi(p)=(0)$. Multiple iterations can be performed to get perfect projection, but this will usually not be necessary.

1.5.5 Position Projection Method

We can take this process one step further by trying to satisfy the position constraint ($\phi(p)=(0)$) at the new timestep. To do this we must first express the Euler position update in terms of the new velocity rather than the current one, otherwise the new position will be independent of $\lambda$.

$$v^* = v + hM^{-1}(f_e + J^T\lambda + f_r) \quad (1.70)$$

$$p^* = p + hQv^* \quad (1.71)$$

so that $$p^* = p + hQ(v + hM^{-1}(f_e + J^T\lambda + f_r)) \quad (1.72)$$

The constraint equation we want to satisfy is (to first order)

$$\phi_o + J_p(p^* - p) = 0 \quad (1.73)$$

But actually to gain more flexibility we will introduce a parameter $\gamma$ which controls how much we want to satisfy this constraint, so:

$$\phi_0 + J_p(p^* - p) = (1-\gamma)\phi_0 \quad (1.74)$$

so if $\gamma=0$ we are assumed to already have the correct position and no position projection will be done ($\gamma=1$) will give us normal position projection). So $$\phi_0 + J_p hQ(v + hM^{-1}(f_e + J^T\lambda + f_r)) = (1-\gamma)\phi_0 \quad (1.75)$$

$$h^2(J_p QM^{-1}J^T)\lambda = -\gamma\phi_0 + hJ_p Q(v + hM^{-1}(f_e + f_r)) \quad (1.76)$$

$$(JM^{-1}J^T)\lambda = -\frac{\gamma\phi_0}{h^2} - \frac{Jv}{h} - JM^{-1}(f_e + f_r) \quad (1.77)$$

which is similar to equation 1.64 except for the addition of the term $-\gamma\phi_0/h^2$. This equation ensures that the position constraints are met at the new state, which reduces constraint violation compared to equation 1.64. It also means that a separate position projection step is not required (position projection here is considerably less expensive).

1.5.6 Summary

For a standard Euler update, satisfy acceleration constraints by $$(JM^{-1}J^T)\lambda = c - JM^{-1}(f_e + f_r) \quad (1.78)$$

For a standard Euler update, satisfy velocity constraints by $$(JM^{-1}J^T)\lambda = -\frac{Jv}{h} - JM^{-1}(f_e + f_r) \quad (1.79)$$

For a modified Euler update, satisfy position constraints by $$(JM^{-1}J^T)\lambda = -\frac{\gamma\phi^0}{h^2} - \frac{Jv}{h} - JM^{-1}(f_e + f_r) \quad (1.80)$$

2.0 Contact with Friction

The Coulomb friction model relates the normal and tangential force at each contact point between two bodies. The distinction is made between static and dynamic friction. With static friction there is no relative movement (sliding) between points that are in contact, and the following equation is satisfied:

$$|\lambda_t| \leq \mu\lambda_n \quad (2.1)$$

where $\lambda_n$ is the (scalar) normal force, $\lambda_t$ is the 2×I tangential force, and $\mu$ is the static friction coefficient. With dynamic friction the two surfaces are in relative motion and a different equation applies:

$$\lambda_1 = \mu_d \lambda_n \frac{v}{n} \quad (2.2)$$

where v is the relative surface velocity vector (2×1) and $\mu_d$ is the dynamic friction coefficient. Equation 2.1 defines a friction cone, the boundary between static and dynamic friction.

With acceleration based friction models such as those used by Baraff the distinction between static and sliding friction is made explicitly, and care must be taken to ensure that switching between the two modes happens correctly. Baraff's acceleration based friction model generates an LCP problem that can sometimes be inconsistent, and even when it is consistent it is not guaranteed to be solvable by his Cottle-Dantzig based LCP method.

2.1 Velocity Based Model

Figure 8:
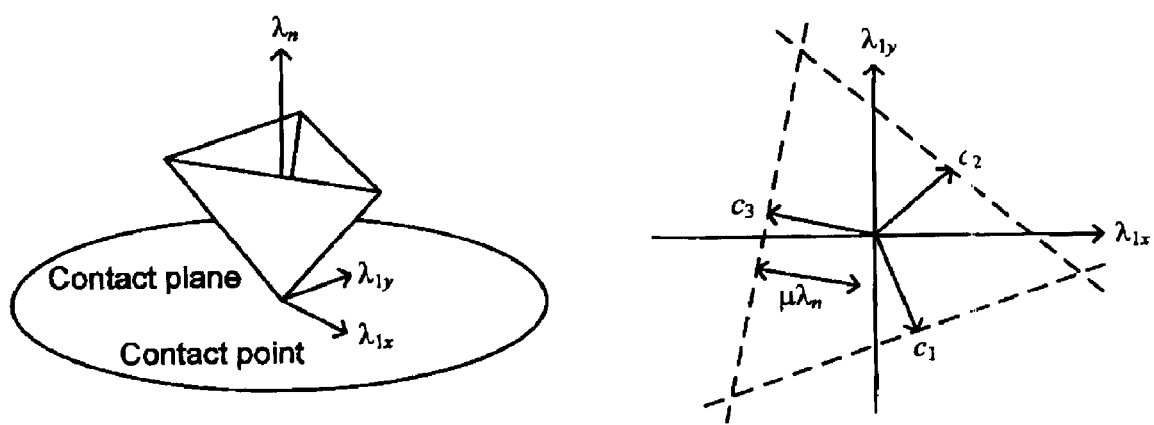
FIG. 8 is an illustration of a friction pyramid.

The velocity based formulation of Anitescu and Potra resolves some of these problems. First, to allow a linear complementarity solution the friction cone is approximated by a friction pyramid (FIG. 8). The pyramid has s sides which are given by the 2×1 vectors $c_1 \ldots c_s$. The conditions corresponding to equation 2.1 are:

$$\forall i: c_i^T(\lambda_1 - \mu\lambda_n c_i) \leq 0 \quad (2.3)$$

$$c_i^T\lambda_1 - \mu\lambda_n c_i^T c_i \leq 0 \quad (2.4)$$

$$-c_i^T\lambda_1 + \mu\lambda_n \geq 0 \quad (2.5)$$

Each side of the friction pyramid has a scalar velocity residual $\alpha_1$. When the contact is sliding in a direction corresponding to side i, $\alpha_i$ is positive. When the contact is within the friction pyramid, all the $\alpha_i$ are 0. The equation of motion is $$J_t v + \sum_{i=1}^{s} c_i \alpha_i = 0$$

where $J_1$ extracts from the system velocity vector the 2×1 velocity vector in the contact plane. The full system for m contact points is (as a tableau):

| $v\lambda_j$ | $\lambda_{t1} \ldots \lambda_{tm}$ | $\lambda_{t1} \ldots \lambda_{tm}$ | $\alpha_{11} \ldots \alpha_{1s}$ | $\alpha_{m1} \ldots \alpha_{ms}$ | = | (2.6) |
|---|---|---|---|---|---|---|
| $M - J_j^T J_j$ | $-J_{t1}^T \ldots -J_{tm}^T$ | $-J_{n1}^T \ldots -J_{nm}^T$ | | | $= f_e + f_r = 0$ | |
| $J_{t1} \ldots J_{tm}$ | | | $c_1 \ldots c_s$ | $c_1 \ldots c_s$ | $= 0 \ldots = 0$ | |
| $J_{n1} \ldots J_{nm}$ | | | | | $\geq 0 \ldots > 0$ | |
| | $-c_1^T \ldots -c_s^T$ | | $\mu \ldots \mu$ | | $\geq 0 \ldots > 0$ | |
| | $-c_1^T \ldots -c_s^T$ | | $\mu \ldots \mu$ | | $\geq 0 \ldots > 0$ | | where $J_j$ is the joint Jacobian, $J_u$ is the tangential velocity Jacobian for contact i and $J_{ni}$ is the normal velocity Jacobian for contact i. In matrix notation, $$H \begin{bmatrix} v \\ \lambda \\ \alpha \end{bmatrix} = q \qquad (2.7)$$

Note that the friction model is anisotropic, and that there is no separate value of μ for static and dynamic friction.

2.1.1 How to Implement this

Directly implementing an LCP solver for the above model is wasteful, as the matrix that needs to be factorized is larger than necessary (there are 3+s rows for every contact point). A method that uses only 3 rows per contact point will be described below. Consider the statement of standard LCP:

$$Ax = b + w \qquad (2.8)$$

$$x \geq 0 \qquad (2.9)$$

$$w \geq 0 \qquad (2.10)$$

$$x_i w_i = 0 \qquad (2.11)$$

The matrix A has size n×n. The Murty principal pivoting algorithm to solve this problem goes like this Set $\alpha = \{1, 2, \ldots, n\}$. Here $\alpha$ is the set of indexes of "clamped" variables.
Loop
  Solve for x: $x_{\bar{\alpha}}$, $$= A A \frac{-1}{\bar{\alpha}\bar{\alpha}} b_{\bar{\alpha}}, x_{\alpha} = 0$$

Find the residual w: w=Ax−b.
If any elements of x are less than −ϵ, find the first one and add its index to α. Restart the loop.
If any elements of w are less than −ϵ, find the first one and remove its index from α. Restart the loop.
If we get to this point, we have a valid solution (x, w).

This procedure is guaranteed to terminate if A is a P matrix. The value ϵ is a small tolerance, typically $10^{-6}$. A variant of this procedure that is more computationally efficient in practical situations finds the value of x at each iteration by projecting from the totally unclamped solution $A^{-1}b$. At each iteration we ask for the equation Qx=0 to be true, where Q is a matrix with a row for every index in α, with a single 1 in the position corresponding to the index (this is equivalent to asking for all the $x_\alpha$ to be zero).

The projection is done like this:

define $W_\alpha$ such that $w = W_\alpha w_\alpha$ (2.12)

$$x = A^{-1}b + A^{-1}W_\alpha w_\alpha \qquad (2.13)$$

$$QA^{-1}b + QA^{-1}W_\alpha w_\alpha = 0 \text{ (as Qx=0)} \qquad (2.14)$$

$$w_\alpha = -(QA^{-1}W_\alpha)^{-1} QA^{-1} b \qquad (2.15)$$

$$w_\alpha = -(QA^{-1}W_\alpha)^{-1} Qx_0 \qquad (2.16)$$

$$w_{\bar{\alpha}} = 0 \qquad (2.17)$$

where $$x_0 = A^{-1} b \qquad (2.18)$$

The value of $w_\alpha$ is substituted back to get x.

Now, in our case some of the variables in r correspond to normal forces ($\lambda_n$) and some variables correspond to tangential forces ($\lambda_{tx}, \lambda_{ty}$). If the normal force conditions are violated ($\lambda_n \leq 0$) then the normal force can be projected back to zero as above. If the tangential force conditions are violated, the tangential forces must be projected back to the planes that make up the sides of the friction cone. This can be done by simply altering Q so that the appropriate plane equations appear on the rows of Q corresponding to the projected tangential variables.

This is easiest to achieve when we have a four sided friction pyramid. because then $\lambda_{tx}$ and $\lambda_{ty}$ are effectively decoupled from each other. Also this means that a tangential variable will be projected to at most one plane at a time (if we had a many-sided friction volume then many planes could be involved in a projection and the situation becomes more complicated).

Here is the modified Murty algorithm:

Make the matrices $Q^n$, $Q^h$ and $Q_1$ of size n×n such that
  $Q^n x = 0$ is the condition for all normal forces to be zero,
  $Q^h x = 0$ is the condition for all tangential forces to be clamped at the "high" plane, and $Q^1 x = 0$ is the condition for all tangential forces to be clamped at the "low" plane.
Set $\alpha_n = \alpha_h = \alpha_1 = \{\ \}$. Here $\alpha_n$ is the set of clamped normal forces, $\alpha_1$ and $\alpha_h$ are the sets of clamped-low and clamped-high tangential indexes.
Loop
  Set $\alpha = \alpha_n \cap \alpha_1 \cap \alpha_h$,
  Set Q:

$$Q = \begin{bmatrix} Q_{\alpha_n\alpha_n}^n \\ Q_{\alpha_1\alpha_1}^1 \\ Q_{\alpha_h\alpha_h}^h \end{bmatrix} \quad (2.19)$$

Solve for x:

$$w_\alpha = -(QA^{-1}W_\alpha)^{-1}Qx_0 \quad (2.20)$$

$$w_\alpha = 0 \quad (2.21)$$

$$x = x_0 + A^{-1}W_\alpha w_\alpha \quad (2.22)$$

If any normal elements of x are less than $-\epsilon$, find the first one and add its index to $\alpha_n$. Restart the loop.
If any elements of $Q^1_x$ are less than $-\epsilon$, find the first one and add its index to $\alpha_1$. Restart the loop.
If any elements of $Q^h_x$ are less than $-\epsilon$, find the first one and add its index to $\alpha_h$. Restart the loop.
If any normal elements of w are less than $-\epsilon$, find the first one and remove its index from $\alpha_n$. Restart the loop.
If any clamped-low tangential elements of w are less than $-\epsilon$, find the first one and remove its index from $\alpha_l$. Restart the loop.
If any clamped-high tangential elements of w are greater than C, find the first one and remove its index from $\alpha_h$. Restart the loop.
If we get to this point, we have a valid solution (x, w).

This algorithm simulates what happens when the full problem in the previous section's tableau is solved with the standard Murty algorithm. This problem is guaranteed to have at least one solution, but unfortunately this algorithm is not guaranteed to find it. As $\mu$ gets larger the algorithm will start to cycle though the same index sets. In practice this rarely happens with physically realistic values of $\mu$.

There are two possible ways to fix this problem. The first is to try and add heuristics to the projection process to restrict the possible combinations of clamped and unclamped states (see the matlab code for some examples). This has not been successful so far. The second is to detect when we come back on a previously encountered index set and then alter the rules for index swapping to prevent us following the same path. This could possibly be done preemptively at the level of individual friction pyramids before the global index set has repeated. This has not been tried yet, it is difficult in matlab.

There are several simple things that improve the speed of this algorithm. The first is finding a good starting index set, by applying the switching condition to every single index in one go. In fact this procedure may be followed for several iterations to improve performance, although it must be eventually abandoned for the one-at-a-time approach to ensure convergence. Also re-using index sets from the previous simulation iteration is useful. We need to investigate heuristics for choosing the switching index. For example, should we switch on the most or least violating index?

2.1.2 Tyres

Tyres have special friction requirements. When the tyre is under longitudinal force, the friction cone is actually scaled along one axis into a sort of friction ellipse. This can be simulated by altering the friction pyramid so that it is a kind of friction "diamond", and ensuring that the tangential x and y axes are aligned with the wheel. Tyres also have the characteristics of slip and pneumatic trail, which I have not investigated yet.

3.0 More Implicit Integration

It is possible to perform implicit integration on only some state variables in a system. For example, we can divide up the variables like this:

$y^E$=explicitly integrated variables $\quad (3.1)$ $y^I$=implicitly integrated variables $\quad (3.2)$ $$\dot{y}^E = f^E(y^E, y^I) \quad (3.3)$$

$$\dot{y}^I = f^I(y^E, y^I) \quad (3.4)$$

And we can integrate like this (Euler first order):

$$y_{i+1}^E = y_i^E + hf^E(y_i^E, y_i^I) \quad (3.5)$$

$$y_{i+1}^I = y_i^I + hf^I(y_{i+1}^E, y_{i+1}^I) \quad (3.6)$$

$$\approx y_i^I + h\left[1 - h\frac{\partial}{\partial_y}f^I(y)\Big|_{(y_i^E, y_i^I)} - \right]^{-1} f^I(y_i^E, y_i^I) \quad (3.7)$$

More useful in rigid body dynamics is being implicit in some inputs to a system. Consider the system:

$$\dot{y} = f(y, x) \quad (3.8)$$

$$x = g(y) \quad (3.9)$$

Here f is the rigid body system, y is its state variables, and x is the "external" forces presented to it. We can do implicit Euler integration only in the variables x as follows:

$$y_{i+1} = y_i + hf(y_i, x_{i+1}) \quad (3.10)$$

$$x_{i+1} = g(y_{i+1}) \quad (3.11)$$

if we make first order approximations for f and g:

$$f(y, x) \approx f(y_i, x_i) + J_F(x - x_i) \quad (3.12)$$

$$g(y) \approx g(y_i) + J_G(y - y_i) \quad (3.13)$$

which gives $$y_{i+1} = y_i + \left(\frac{1}{h} - J_F J_G\right)^{-1} f(y_i, x_i) \quad (3.14)$$

If the external forces x are stiff, e.g. if they come from stiff springs, then this formulation will add extra stability to the system without the overhead of making the rigid body dynamics fully implicit.

To implement this scheme we need to compute $J_F$ and $J_G$. Computing $J_G$ should be relatively easy. To compute $J_F$ first define the external force $f_c$ as $$f_c = Qx \quad (3.15)$$

then $$\frac{d}{dx}f(.) = \frac{d}{dx}\dot{v} \quad (3.16)$$

-continued $$= \left(\frac{\partial}{\partial f_c}\dot{v} + \frac{\partial}{\partial \lambda}\dot{v} \cdot \frac{\partial \lambda}{\partial f_c}\right)\frac{\partial f_c}{\partial x} \quad (3.17)$$

$$= M^{-1}Q - M^{-1}J^T(JM^{-1}J^T)^{-1}JM^{-1}Q \quad (3.18)$$

which means that for the already factored system matrix $(JM^{-1}J^T)^{-1}$ we must solve for $n_x$ extra right hand sides in the matrix $JM^{-1}$ Q and then do a few other cheaper operations. Thus we should be selective about which external forces get the implicit treatment (stiff forces are the obvious candidates).

3.1 Modular Systems

The construction of modular systems and the application of the chain rule to propagate jacobian information for the purposes of implicit integration are well known in the art. An example is provided in the MATLAB reference manual.

APPENDIX 2

Contents

1. Conventions
2. Kea core
    2.1. Error Handling
    2.2. Math stuff
        2.2.1. Miscellaneous
        2.2.2. Vector and quaternion stuff
        2.2.3. Simple Matrix Stuff
    2.3. Rigid body dynamics core
        2.3.1. Rigid Body Structure
        2.3.2. Rigid Body Functions
        2.3.3. Abstract Constraint Functions
        2.3.4. Worlds
3. Constraints
    3.1. Contact
    3.2. Ball-and-socket
    3.3. Hinge
    3.4. Prismatic
    3.5. Steering hinge (1)
4. Collision
5. Utilities
    5.1. Kinematics
        5.1.1. Telescope Segment
        5.1.2. Keep Place
6. Other
    6.1. Constraints
    6.2. Dynamics scheduler
    6.3. More Functions
    6.4. Controller layer 1. Conventions All matrices are stored in column-major order, i.e. stored by columns.

2. Kea Core
    2.1. Error Handling

The following three functions are used internally within Kea to generate error and warning messages:

void keaFatalError (char @msg, . . . );
void keaDebug (char *msg, . . . );
void keaWarning (char *msg, . . . );

Each of these functions has an interface identical to printf ( ), they take an error message string and a variable number of arguments. These functions can also be called by the user.

The default behavior of these functions is as follows:
    keaFatalError: print the error message to the console and exit.
    keaDebug: print the error message to the console, generate debugging information (e.g. dump core on a unix system) and exit.
    keaWarning: print the error message to the console, and continue running.

The default behavior can be overridden using these functions:
    typedef void keaErrorFunction (char *msg, . . . );
    void keaSetFatalErrorHandler (keaErrorFunction *fn);
    void keaSetDebugHandler (keaErrorFunction *fn);
    void keaSetWarningHandler (keaErrorFunction *fn);

It is useful to override the default behavior on systems without a text console (for example the PlayStation 2) or in shipping software. Note that the fatal error and debug calls are expected never to return, however they may perform exception handling using the C set-jmp ( )/longjmp ( )functions.

2.2. Math Stuff

The typedef keaFloat is used everywhere in Kea as the floating point type. The constant keaInfinity is defined to correspond to the system infinity value, or if that does not exist the largest representable floating point value.

2.2.1. Miscellaneous void keaSetZero (int n, keaFloat *A);
    Set the first n elements of A to zero. For large arrays this will normally be faster than a simple for-loop.

2.2.2. Vector and Quaternion Stuff keaFloat keaDot (keaFloat b [3], keaFloat c [3]);
    Return the inner product of b and c, assuming both are vectors of size 3.

void keaCross (keaFloat b [3], keyFloat c [3], keaFloat a [3]);
    Set a to the cross product of b and c. assuming both are vectors of size 3.

void keaPlaneSpace (keaFloat n[3], keaFloat a[3], keaFloat b [3]);
    Make unit length 3×1 vectors a and b such that together with the unit length 3×1 vector n they form an orthonormal basis. a and b span the plane that is normal to n, and a×b n. note that if n is not normalized then b will not be normalized either.

void keaQProduct (keaFloat p [4], keaFloat q [4], keaFloat r [4]);
    Multiplication of quaternions: set r=p*q.

void keaMakeUnitVector (keaFloat v [3]);
    Make the given size 3 vector unit length.

2.2.3. Simple Matrix Stuff void keaMultiply (int p, int q, int r, keaFloat *B, keaFloat *C, keaFloat *A);
    Set A=B*C, where A is p*r, B is p*q, C is q*r.

void keaMultiplyT1 (int p, int c, int r, keaFloat *B, keaFloat *C, keaFloat *A);
   Set A=BT*C, where A is p*r, B is q*p, C is q*r.

2.3. Rigid Body Dynamics Core

2.3.1. Rigid Body Structure

The keaBody structure represents a rigid body in Kea. The coordinates of a rigid body (x, y, z) are always with respect to the body's center of mass.

There are a number of internal variables that are made public for ease of access. You should not modify these directly!

struct keaBody (
   void *userdata;
   keaFloat mass, I [9];
   keaFloat pos [3], qrot [4], vel [6];
   keaFloat R[9];
   ... other internal stuff ...
)

The body's mass parameters are mass and I, a 3×3 symmetric inertia tensor matrix. The body's state variables are
   pos, the center of mass (COM) position (x, y, z).
   qrot, the four quaternion rotation numbers.
   vel, the COM velocity (vx, vy, vz). and the angular velocity (wx, wy, wz).

R is the body 3×3 rotation matrix. It is a direct function of the qrot vector, and it is updated whenever qrot changes.

userdata is a variable that the user is free to change, this is never used by Kea.

2.3.2. Rigid Body Functions

All rigid body functions can be called at any time between simulation timesteps. void keaBodyInitialize (keaBody *body);
   Initialize the body. This must be the first function called on a new body.

void keaBodyAttach (keaBody *body, keaWorld *world);
   Attach the body to the world, making it an active part of that world. A body must be attached to a world before it can have constraints attached to it. If the body is already attached to another world it will be detached from that world first. If the body is already attached to the world then nothing will be done.

void keaBodyDetach (keaBody *body);
   Detach the body from whatever world it is currently attached to. Any constraints that are connected to this body are disconnected first. This does not destroy any body data, it simply prevents the body from being a part of the simulation. The body can be reattached at any time.

Now here are some functions to set the mass distribution of the body.

void keaBodyMakeSphere (keaBody *body, keaFloat mass, keaFloat radius);
   Set the mass parameters of this body to a sphere of the given mass and radius.

void keaBodyMakeBox (keaBody *body, keaFloat mass, keaFloat lx, keaFloat ly, keaFloat lz);
   Set the mass parameters of this body to a box of the given mass and side lengths.

Now here are some functions to set the position, rotation, and velocity of the body. If you set values that are inconsistent with the current constraints then the simulation will attempt to correct this in subsequent time steps.

void keaBodvSetPosition (keaBody *body, keaFloat x, keaFloat y, keaFloat z);

void keaBodySetQuaternion (keaBody *body, keaFloat q1, keaFloat q2, keaFloat q3, keaFloat q4);

void keaBodySetLinearVelocity (keaBody *body, keaFloat dx, keaFloat dy, keaFloat dz);

void keaBodySetAngularVelocity (keaBody *body, keaFloat wx, keaFloat wy, keaFloat wz);

Now here are some functions to add forces to the body. After each time step the body is assumed to have zero force acting on it. These functions accumulate force on the body for the next time step.

void keaBodyAndForceAbs (keaBody *body, keaFloat fx, keaFloat fy, keaFloat fz);

void keaBodyAddForceRel (keaBody *body, keaFloat fx, keaFloat fy, keaFloat fz);
   Add a force, in the absolute (inertial) frame or the relative (body) frame, to the body's center of mass.

void keaBodyAddTorqueAbs
   (keaBody *body, keaFloat tx, keaFloat ty, keaFloat tz);

void keaBodyAddTorqueRel
   (keaBody *body, keaFloat tx, keaFloat ty, keaFloat tz);
   Add a torque, in the absolute (inertial) frame or the relative (body) frame, to the body's center of mass.

2.3.3. Abstract Constraint Functions

The keaConstraint structure represents a one, two or three body constraint. The constraint services described below are used by all the system joint types, and allow new constraint types to be created by the user. Note that all variables in the keaConstraint structure are internal and should not be accessed directly.

The following constraint functions can be called at any time in the simulation.

void keaConstraintInitialize (keaConstraint *c);
   Initialize the constraint. This must be the first function called on a new constraint.

void keaConstraintAttach (keaConstraint *c, keaWorld *world);
   Attach the constraint to the given world, making it an active part of that world. If the constraint is attached to another world, it will be detached from that world first. If the constraint is already attached to the world then nothing will be done.

void keaConstraintDetach (keaConstraint *c);
   Detach the constraint from whatever world it is currently attached to. This does not destroy any constraint data, it simply prevents the constraint from being a part of the simulation. The constraint can be re-attached at any time.

void keaConstraintSetBodies (keaConstraint *c, keaBody *b1, keaBody *b2, keaBody *b3);
   This set the bodies that the constraint attaches. The constraint must have been attached to a world, and the bodies must be in the same world.

keaConstraintDefine (keaConstraint *c, int num_ce, keaGetInfoFn *getinfo, keaStartStepFn
  *startstep);
  Sets the behavior of the constraint. This is only called to define new constraint types. num_ce is the number of constraint equations. getinfo and startstep are pointers to functions that implement the constraint behavior. getinfo gets information about this constraint for the current state of the constrained bodies. startstep is called automatically at the start of each timestep, it can set some auxiliary state-based data (such as joint angles) which the user can read. If you change the state of the constraint or the bodies which it connects then you may call this function yourself to update that data. Arguments to the getinfo function are provided in a structure rather than being passed directly, to allow for future expansion without having to rewrite all the constraint code. The getinfo function is free to ignore any of the arguments in this structure, except for the essential 'J'. Each matrix/vector here has num_ce rows to fill in.

struct keaConstraintInfo (
  keaFloat *J[3];
  int rowskip;
  keaFloat *c;
  keaFloat *xi;
  keaFloat *lower, *upper;
  keaFloat *slipfactor;
);
typedef void keaGetInfoFn (keaConstraintInfo *);

The structure members are:
  J: Up to 3 pointers to Jacobian matrices that must be filled in. These matrices are stored by rows for convenience in constraint formation, in contrast to the usual Kea storage convention.
  rowskip: How much to jump by to go between J matrix rows.
  c: Vector in the constraint equation J*v=c.
  xi: Constraint error vector.
  lower, upper: Lagrange multiplier limits.
  slipfactor: First order constraint slipping vector.

2.3.4. Worlds

The keaWorld structure represents a simulated world in Kea. All members of this structure are internal and should not be accessed directly.

void keaWorldInitialize (keaWorld *world);
  Initialize a new world. After initialization, bodies and constraints can be attached to it.

void keaWorldDestroy (keaWorld *world);
  Destroy the given world. This simply detaches all bodies and constraints from the world, emptying it.

void keaWorldAddGravity (keaWorld *world, keaFloat gravity);
  Add a downwards (–z) gravity force to all bodies in the world. gravity is given in m/s2.

void keaWorldStep1 (keaWorld *world, keaFloat stepsize);
  Evolve the world forward in time by stepsize seconds. This uses an algorithm which will be fast, except for systems containing large articulated rigid body structures.

void keaWorldSetEpsilon (keaWorld *world, keaFloat x);
void keaWorldSetGamma (keaWorld *world, keaFloat x);

These functions set world parameters. Increasing epsilon helps to combat numerical instability problems caused by degenerate systems. Increasing it will make the simulation more "non-physical" but may smooth over simulation glitches. The default value is 0.0001, increasing this to 0.1-1 will result in observable non-physical effects for worlds where that masses are on the order of 1 kg.

Gamma is the projection constant which controls constraint stabilization. If the rigid body configuration has diverged from its constrained configuration, the next time step it will be brought a fraction 'gamma' of the way back to its correct configuration. Setting gamma to zero will result in articulated structures gradually coming apart. Setting gamma to one and higher will result in instabilities as the simulation tries to "overcorrect". The default value is 0.2, and that is probably good enough for most simulations.

3. Constraints

To make a constraint, call its initialization functions, and then call the keaConstraintAttach ( ) and keaConstraintSetBodies ( ) functions.

3.1. Contact

The keaContact constraint is a collision contact between body 1 and body 2, or a collision contact between body 1 and the static environment. The keaContact structure has a number of public variables that must be set before the world step function is called:

struct keaContact (
  int mode;
  keaFloat cpos [3];
  keaFloat normal [3];
  keaFloat penetration;
  keaFloat maxforce;
  keaFloat a [3];
  keaFloat k1;
  . . . other internal stuff.
)

The fields of keaContact are:
  mode: The contact mode is one of the following constants:
    o: Zero friction.
    KEA_FRICTION-2D: Friction in two directions using automatically determined principal directions.
    KEA_FRICTION_1D: Friction in one direction (vector a).
    KEA_FRICTION_TYRE1: Friction in wheel drive direction (vector a) and first order slip in the lateral (other tangential) direction. The slip factor is the value k1. The following flags can be ORed with mode:
    KEA_FRICTION_BOX: Friction force magnitude along each principal direction is limited to maxforce.
  cpos: The contact position, in absolute coordinates. This must always be set.
  normal: The vector that is normal to the contact sliding plane, relative to body 1. This must have unit length. This must point 'in' to body 1, that is body 1 motion is allowed along the direction of +normal and body 2 motion is allowed along the direction of –normal. This must always be set.
  penetration: The penetration distances of the contact along the normal direction. This must always be set.
  max_force: The maximum frictional force that can be applied. This is set when the box friction flag is set.

a: Parameter vector a. This is set in KEA_FRICTION_1D and KEA_FRICTION_TYRE1 modes. It must have unit length.

k1: Parameter k1. This is set in KEA_FRICTION_TYRE1 mode.

The keaContact functions are:

void keaContactInitialize (keaContact *contact);
　Initialize a new contact.

3.2. Ball-and-Socket

The keaBSJoint structure represents a ball and socket joint.

void keaBSJointhnitialize (keaBSJoint *joint);
　Initialize a new ball and socket joint.

keaBSJointSetPosition (keaBSJoint *joint, keaFloat x, keaFloat y, keaFloat z);
　Set the joint position (in absolute coordinates). The constraint bodies must have been set first. and the positions of the joined bodies must have been set.

3.3. Hinge

The keaHinge structure represents a hinge joint. Note that the initial position of the hinge will be taken as the zero reference for angle determination.

void keaHingeInitialize (keaHinge *joint);
　Initialize a new hinge joint.

void keaHingeSetPosition
　(keaHinge *joint, keaFloat x, keaFloat y, keaFloat z);

void keaHingeSetAxis
　(keaHinge *joint, keaFloat x, keaFloat y, keaFloat z);
　Set the position of the hinge joint and its axis (in absolute coordinates). The joint bodies must have been set first, and the positions of the joined bodies must have been set.

void keaHingeSetNoLimits (keaHinge *joint);

void keaHingeSetLimits (keaHinge *joint, keaFloat low, keaFloat high);
　Set joint limits. low and high are in radians and are relative to the zero reference determined by the initial position of the hinge.

void keaHingeSetNoMotor (keaHinge *joint);

void keaHingeSetLimitedForceMotor (keaHinge *joint, keaFloat desired_velocity, keaFloat force limit);
　Sets a motor on the hinge.

keaFloat keaHingeGetAxisAbs (keaHinge *joint);
　Returns a pointer to a size 3 vector which gives the current hinge axis in absolute coordinates. keaFloat keaHingeGetAngle (keaHinge *joint);

keaFloat keaHingeGetAngleRate (keaHinge *joint);
　Returns the current hinge angle and angular velocity.

3.4. Prismatic

The keaPrism structure represents a prismatic joint.

void keaprismInitialize (keaprism *joint);
　Initialize a new prismatic joint.

void keaPrismSetAxis (keaprism *joint, keaFloat x, keaFloat y, keaFloat z);
　Set the sliding axis for the prismatic joint (in absolute coordinates). The joint bodies must have been set first, and the positions of the joined bodies must have been set.

void keaPrismSetNoLimits (keaprism *joint);

void keaPrismSetLimits (keaprism *joint, keaFloat low, keaFloat high);
　Set joint limits. low and high are in meters-position zero is when the centers of mass of the two bodies are as close to each other as possible.

void keaPrismSetNoMotor (keaprism *joint);

void keaPrismSetLimitedForceMotor (keaPrism *joint, keaFloat desired_velocity, keaFloat force limit);
　Sets a motor on the joint.

keaFloat *kea PrismGetAxisAbs (keaprism *joint);
　Returns a pointer to a size 3 vector which gives the current sliding axis in absolute coordinates.

keaFloat keaPrismGetPosition (keaprism *joint);

keaFloat keaPrismGetPositionRate (keaprism *joint);
　Returns the current sliding position and velocity. Position zero is when the centers of mass of the two bodies are as close to each other as possible.

3.5. Steering Hinge (1)

The keaSteeringHinge structure represents a steering hinge joint, which is a hinge that can be steered along a steering axis. This joint is useful on the front wheels of cars. Body 1 is the chassis and body 2 is the wheel. The connection point for the wheel body is its center of mass.

void keaSteeringHingeInitialize (keaSteeringHinge *joint);
　Initialize a new steering hinge joint.

void keaSteeringHingeSetSteeringAxis
　(keaSteeringHinge *joint, keaFloat x, keaFloat y, keaFloat z)

void keaSteeringHingeSetHingeAxis
　(keaSteeringHinge *joint, keaFloat x, keaFloat y, keaFloat z);
　These functions set the joint geometry, the steering axis and the hinge axis. The joint bodies must have been set first, and the positions of the joined bodies must have been set.

keaFloat *keaSteeringHingeGetHingeAxisAbs (keaSteeringHinge *joint);

keaFloat *keaSteeringHingeGetSteeringAxisAbs (keaSteeringHinge *joint);
　Returns pointers to size 3 vectors which give the current hinge and steering axes in absolute coordinates.

4. Collision

The Kea collision API is in a state of flux and will not be documented here yet. But check out the source file kea_collide. h if you want to know what the current story is.

5. Utilities

5.1. Kinematics

These functions allow for easy kinematic (rather than dynamic) placement of objects. They are specific to particular kinematic situations that the author has come across in the past, so not all common cases are covered here!

5.1.1. Telescope Segment

The keaKinematicTelescopeSegment structure and associated functions allow kinematic placement of an intermediate telescope segment (body 3) given the positions of the segments at the ends of the telescope (body I and body 2).

void keaKineTaticTelescopeSegmentInitialize (keaKinematicTelescopeSegment *k,
  keaFloat pos1 [3], keaFloat R [9], keaFloat pos2 [3], keaFloat pos3 [3]);
    Initialize a keaKinematicTelescopeSegment structure, giving the initial positions of the three bodies, and the rotation matrix of body 1.

void keaKinematicTelescopeSegmentGetPosition (keaKinematicTelescopeSegment *k, keaFloat pos1 [3], keaFloat R [9], keaFloa pos2 [3], keaFloat pos3 [3]);
    Given the positions of bodies 1 and the rotation matrix of body 1, return the position of body 3.

5.1.2. Keep Place

The keaKinematicKeepPlace structure and associated functions allow kinematic placement of a body (number 2) always in the same place relative to another body (number 1).

void keaKinematicKeepDlaceInitialize (keaKinematicKeepPlace *k, keaFloat pos1 [3], keaFloat R [9], keaFloat pos2 [3]);
    Initialize a keaKinematicKeepPlace structure, giving the initial positions of the bodies, and the rotation matrix of body 1.

void keaKinematicKeepPlaceGetPosition (keaKinematicKeepPlace *k, keaFloat pos1 [3], keaFloat R [9], keaFloat pos2 [3]);
    Given the position and rotation matrix of body 1, return the position of body 2.

6. Other

Some parts of the Kea API are not covered here, mostly those parts that haven't even been designed yet! Here are notes about what is missing.

6.1. Constraints

More constraint types are needed, especially the linear-1, angular-1 stuff from the SDK.

This will be trivial to add.

Document the functions that help implement user defined constraints, e.g. getting the bodies a constraint attaches.

For the contact constraint, we are currently missing:
    velocity dependent slip.
    the friction cone one-step-late approximation.
    keep the physical stuff in separate structure, i.e. separate the physical quantities from the geometrical ones.

Take a look at how well the keaConstraint functions operate on the joint types—is there an annoying type casting issue?

6.2. Dynamics Scheduler

This things hasn't even been designed yet. It could sit outside the Kea core, in which case we must check how to detach groups of RBs and constraints from the world without destroying the relationships between then, so they can be attached again later.

6.3. More Functions

Need more functions to compute rotations, e.g. to set body orientation. Use functions from glowworm. Open source.

Need more functions to add force to bodies, e.g. at a non-COM position.

Again, use the functions from glowworm. Open source.

6.4. Controller Layer

An open source dataflow based control layer, that allows us to easily implement 'gadgets' such as springs, PD controllers etc. Issues: data transfer (wiring), encapsulation of basic Kea structures, driving of the simulation. This should be quite easy.

APPENDIX 3

Stiff Spring Simulation

From Notes by Russell Smith

This describes how to implement a stiff spring in Kea using constraints. The key is to allow first order slip along the spring direction. Consider a one dimensional single particle system (mass m):

$$\dot{p} = v \tag{3.1}$$

$$\dot{v} = \frac{1}{m}(f + J^T \lambda) \tag{3.2}$$

where p is the point position, v is its velocity, f is the external force and $\lambda$ is the constraint force (all scalars). We will enforce the constraint p=0 by setting J to 1. Thus from equation 1.80 in appendix 1, $\lambda$ is computed as:

$$\left(\frac{l}{m} + \varepsilon\right)\lambda = -\frac{\gamma p}{h^2} - \frac{v}{h} - \frac{f}{m} \tag{3.3}$$

so the semi-implicit update for p and v is:

$$v_{i+1} = v_i + \frac{h}{m}(f + \lambda) \tag{3.4}$$

$$= v_i + \frac{hf}{m} + \frac{-\frac{\gamma p}{hm} - \frac{v}{m} - \frac{hf}{m^2}}{\frac{1}{m} + \varepsilon} \tag{3.5}$$

$$= v_i + hf\left(\frac{\varepsilon}{1 + m\varepsilon}\right) + \frac{-\frac{\gamma p}{h} - v}{1 + m\varepsilon} \tag{3.6}$$

$$= v_i + f\left(\frac{h\varepsilon}{1 + m\varepsilon}\right) + v\left(\frac{m\varepsilon}{1 + m\varepsilon}\right) + p\left(\frac{-\gamma}{h(1 + m\varepsilon)}\right) \tag{3.7}$$

and $$p_{i+1} = p_i + h v_{i+1} \tag{3.8}$$

Now consider removing the constraint, adding an external spring and damper force, and integrating implicitly:

$$f_i = -k_p p_i - k_d v_i \tag{3.9}$$

$$\lambda = 0 \tag{3.10}$$

$$p_{i+1} = p_i + h v_{i+1} \tag{3.11}$$

$$v_{i+1} = v_i + \frac{h}{m} f_{i+1} \tag{3.12}$$

-continued $$= v_i + \frac{h}{m}(-k_p p_{i+1} - k_d v_{i+1}) \quad (3.13)$$

$$= v_i + \frac{h}{m}(-k_p(p_i + h v_{i+1}) - k_d v_{i+1}) \quad (3.14)$$

$$v_{i+1}\left(1 + \frac{h^2 k_p + h k_d}{m}\right) = v_i - \frac{h k_p}{m} p_i \quad (3.15)$$

$$V_{i+1} = v_i\left(\frac{m}{m + h^2 k_p + h k_d}\right) + p_i\left(\frac{-h k_p}{m + h^2 k_p + h k_d}\right) \quad (3.16)$$

We can equate coefficients with equation (3.7) to see how to construct an "implicitly integrated spring" with a constraint (take f to be zero in equation (3.7)). First equate the coefficient on $v_j$ to find $\epsilon$:

$$\frac{m\varepsilon}{1 + m\varepsilon} = \frac{m}{m + h^2 k_p + h k_d} \quad (3.17)$$

$$\varepsilon(m + h^2 k_p + h k_d) = 1 + m\varepsilon \quad (3.18)$$

$$\varepsilon = \frac{1}{h^2 k_p + h k_d} \quad (3.19)$$

Then equate the coefficient on $p_i$ to find $\gamma$:

$$\frac{-\gamma}{h(1 + m\varepsilon)} = \frac{-h k_p}{m + h^2 k_p + h k_d} \quad (3.20)$$

$$\gamma = \frac{h^2 k_p(1 + m\varepsilon)}{m + h^2 k_p + h k_d} \quad (3.21)$$

$$= \frac{h k_p}{h k_p + k_d} \quad (3.22)$$

The parameters $\epsilon$ and $\gamma$ are both dependent on the time step, but they are not dependent on the mass, so this constraint functions as a true spring. When $\epsilon$ is 0 this corresponds to a spring or damper constant of infinity, which results in an unmovable spring (complete constraint satisfaction).

APPENDIX 4

4.1 Linear Complementarity Problems

Given a real square n×n matrix M and a real n-dimensional vector q, the complementarity problem consists of finding the n-dimensional vectors z and w such that they satisfy the following conditions:

$$Mz + q = w \quad (4.26)$$

$$z_i \geq 0 \ \forall i \in (1, 2, \ldots, n) \quad (4.27)$$

$$w_i \geq 0 \ \forall i \in (1, 2, \ldots, n) \quad (4.28)$$

$$w_i z_i \geq 0 \ \forall i \in (1, 2, \ldots, n) \quad (4.29)$$

This is fundamentally a combinatorial problem and various direct algorithms are available where the search goes through index sets $\alpha$, $\beta$ such that $\alpha \subseteq \{1, 2, \ldots, n\}$, $\beta \subseteq \{1, 2, \ldots, n\}$, $\alpha \cap \beta = \emptyset$, $\alpha \cup \beta = \{1, 2, \ldots, n\}$. The set $\alpha$ is the set of active variables and $w_i = 0 \ \forall i \in \alpha$ while the set $\beta$ is the set of free variables such that $z_i = 0 \ \forall i \in \beta$. The problem is then partitioned as:

$$\begin{bmatrix} M_{\alpha\alpha} & M_{\alpha\beta} \\ M_{\beta\alpha} & M_{\beta\beta} \end{bmatrix}\begin{bmatrix} z_\alpha \\ 0 \end{bmatrix} + \begin{bmatrix} q_\alpha \\ q_\beta \end{bmatrix} = \begin{bmatrix} 0 \\ w_\beta \end{bmatrix} \quad (4.30)$$

where the subscripts $\alpha$, $\beta$, are used to specify all indices that are in the sets $\alpha$, $\beta$ respectively. This is equivalent to the linear algebra problem:

$$M_{\alpha\alpha} z_\alpha = -q \quad (4.31)$$

$$w_\beta = M_{\beta\alpha} z_\alpha + q_\beta \quad (4.32)$$

which must be solved for $z_\alpha$ while B is computed by direct substitution. The matrix $M_{\alpha\alpha}$ is known as a principal submatrix of the matrix M. Various principal pivoting algorithms perform the same basic computation but take different strategies to revise the sets $\alpha$ and $\beta$ from the computed complementarity point which is a vector s such that:

$$si = \begin{cases} z_i & \forall i \in \alpha \\ w_i & \forall i \in \beta \end{cases} \quad (4.33)$$

All principal pivot methods go through a sequence of sets $\alpha_i$, $\beta_i$, i=1, 2, ... until a solution is found i.e., $s_i \geq 0 \ \forall i \in \{1, 2, \ldots, n\}$.

4.2 The Murty Algorithm

One important such algorithm is the Murty Principal Pivot Method which is as follows:
1. Initialize (basically, any guess for $\alpha^{(0)}$ is good), set i=0.
2. form principal submatrix $M_{\alpha^{(i)}\alpha^{(i)}}$ and solve $M\alpha^{(i)}\alpha^{(i)}z_\alpha^{(i)} = q_\alpha^{(i)}$
3. compute $s^{(i)} = z_\alpha^{(i)} + w_\beta^{(i)}$ where $w_\beta^{(i)} = M_\beta^{(i)}{}_\alpha^{(i)} z_\alpha^{(i)}$
4. if $s_j^{(i)} \geq 0 \ \forall j$ we are done
   else
     find the smallest j such that $s_j^{(i)} < 0$,
     if $s_j^{(i)} = z_j$ then $\alpha^{(i+1)} = \alpha^{(i)} \setminus \{j\}$
     else $\alpha^{(i+1)} = \alpha^{(i)} \cup \{j\}$
     i ← i+1
     goto step 2

This algorithm is special in that it is stateless and can be started from any initial guess for $\alpha_0$. This method will work on any P matrix and in particular, any positive definite matrix.

The flowchart for this algorithm is given in FIG. I below.

4.3 The Kostreva Perturbation Method

In the case where the matrix M is positive semi-definite, the Murty principal pivot method can fail. This can arise in a multi-body simulation in the case where the constraints are degenerate, or if we work from the optimization matrix which leads to the form:

$$\begin{bmatrix} N & -J^T \\ J & 0 \end{bmatrix}\begin{bmatrix} v \\ \lambda \end{bmatrix} + \begin{bmatrix} -F \\ c \end{bmatrix} = \begin{bmatrix} 0 \\ v \end{bmatrix} \quad (4.34)$$

$$\lambda \geq 0 \ v \geq 0 \quad (4.35)$$

$$\lambda^1 v = 0 \quad (4.36)$$

for a multibody problem with inequality constraints. This matrix is positive semi-definite if the mass submatrix N is positive definite (which is always the case for physical systems). However, given any number $\epsilon > 0$, the matrix obtained from the original one by adding $\epsilon$ on the diagonal is always positive definite, i.e., the matrix:

$$M_\varepsilon = \begin{bmatrix} N + \varepsilon I_N & -J^T \\ J & \varepsilon I_J \end{bmatrix} \quad (4.37)$$

is positive definite, where $1_N$ and $i_J$ are identity matrices of appropriate sizes. Kostreva demonstrated that one can solve the sequence of complementarity problems defined by a sequence of positive numbers $\{\epsilon_n\}_{n=1}^\infty$ such that $\epsilon \to 0$ as $n \to \infty$ and find an answer to the positive semi-definite problem or find that it is infeasible (i.e., there is no answer). The algorithm is as follows;

1. Choose $\epsilon^{(0)} > 0$ (typically $10^{-6}$)
2. Solve LCP($M_\epsilon^{(0)}$, q)
3. set i←i+1. choose $\epsilon^{(i)} < \epsilon^{(i-1)}$
4. Solve LCP($M_\epsilon^{(i)}$, q)
5. if $\|z^{(i)} - z^{(i-1)}\| <$ to 1 Solve LCP(M,q) and finish
6. else if $\|z^{(i)} - z^{(i-1)}\| <$ max goto step 2
7. else error: problem is infeasible We often set $\epsilon^{(0)} = 10^{-6}$ and $\epsilon^{(1)} = 0$. This is often sufficient. In Kea, we even go further and set $\epsilon^{(0)} = 10^{-3}$ and stop and away i.e., we don't bother don't perturbation.

4.4 Boxed LCPs

The boxed LCP problem starts from the definition of the standard LCP and adds two new n-dimensional vectors 1 and u, lower and upper bounds respectively, such that $1_i < u_i \; \forall I \in \{1, 2, \ldots, n\}$ and then the problem reads:

$$Mz + q = w_+ - w_- \quad (4.38)$$

$$z_i - l_i \geq 0 \; \forall i \in \{1, 2, \ldots, n\} \quad (4.39)$$

$$w_{+i} \geq 0 \; \forall i \in \{1, 2, \ldots, n\} \quad (4.40)$$

$$(z_i - l_i) w_{+i} = 0 \; \forall i \in \{1, 2, \ldots, n\} \quad (4.41)$$

$$u_i - z_i \geq 0 \; \forall i \in \{1, 2, \ldots, n\} \quad (4.42)$$

$$w_{-i} \geq 0 \; \forall i \in \{1, 2, \ldots, n\} \quad (4.43)$$

$$(u_i - z_i) w_{+i} = 0 \; \forall i \in \{1, 2, \ldots, n\} \quad (4.44)$$

This is equivalent to a much larger mixed linear complementarity problem defined as:

$$\begin{bmatrix} M & -ll \\ l & 0 & 0 \end{bmatrix} \begin{bmatrix} z \\ w_+ \\ w_- \end{bmatrix} + \begin{bmatrix} q \\ -l \\ u \end{bmatrix} = \begin{bmatrix} 0 \\ \mu \\ \nu \end{bmatrix} \quad (4.21)$$

$$\mu_i w_{+i} \geq 0 \; \mu_i w_{+i} = 0 \; v_i w_{-i} \geq 0 \; v_i w_{-i} = 0 \quad (4.22)$$

This is precisely the sort of problem that the Kostreva procedure is designed to solve. However, because of the structure of the problem, there are simplifications that can be achieved on this. The idea is to partition the set 3 defined as above into two sets, $\gamma$ and $t$ so that $z_j = 1_j$ for $j \in \gamma$ and $Z_j = u_j$ for $j \in t$. Afterwards, we follow the Murty algorithm but we change the definition of the complementarity point s as follows:

$$s_j = \begin{cases} \min(z_j - 1_j, u_j - z_j) & \forall j \in \alpha \\ (M_{\gamma\alpha} z_\alpha - M_{\gamma\gamma} l_\gamma - M_{\gamma 1} u_1 + q_\gamma)_j & \forall j \in \gamma \\ -(M_{1\alpha} z_\alpha - M_{1\gamma} l_\gamma - M_{\alpha} u_1 + q_1)_j & \forall j \in \iota \end{cases} \quad (4.23)$$

and then, the least index rule is applied to this new complementarity point as follows:

$j = \min \arg(s_j < 0)$ if $j \in \alpha^{(i)}$ and $z_j^{(i)} < 1_j$ then $\alpha^{(i+1)} = \alpha^{(i)} \backslash \{j\} \gamma^{(i+1)} = \gamma^{(i)} \cup \{j\}$, $\iota^{(i+1)} = \iota^{(i)}$ if $j \in \alpha^{(i)}$ and $z_j^{(i)} > \mu_j$ then $\alpha^{(i+1)} = \alpha^{(i)} / \{j\}$, $\iota^{(i+1)} = \iota^{(i)} \cup \{j\}$, $\gamma^{(i+1)} = \gamma^i$ if $j \in \gamma^{(i)}$ then $\alpha^{(i+1)} = \alpha^{(i)} \cup \{j\}$, $\gamma^{(i+1)} = \gamma^{(i)} \backslash \{j\}$, $\iota^{(i+1)} = \iota^{(i)}$ if $j \in \gamma^{(i)}$ then $\alpha^{(i+1)} = \alpha^{(i)} \cup \{j\}$, $t^{(i+1)} = t(i) / \{j\}$, $\gamma^{(i+1)} = \gamma^{(i)}$ This modification of the standard Murty algorithm has not been traced in the literature by the authors yet.

4.5 Box Friction

The Coulomb friction model specifies the tangential forces at a point of contact in terms of the normal force at that point. The model specifies non-ideal constraint forces i.e., forces arising from constraints that do work on the system. This is in sharp contrast to typical ideal constraints which do no work on the system. Coulomb friction implements a maximum dissipation principle i.e., when the velocity at the point of contact is non-zero, the tangential force will be aligned against the velocity in a way that maximizes the work done; for isotropic friction, this means that the force of friction is directly opposed to the velocity of the contact point in the contact plane. One should note that Coulomb friction is a constitutive law i.e., an empirical model which is meant to summarize experimental evidence, in contrast with a fundamental law which can be derived from first principles. As such, "Coulomb's Law" is not so strict: the modeler has license to alter this model to ease computation provided the overall behaviour is still close to what is seen in an experiment.

The Coulomb friction model for a single point describes two states for the contact namely, sticking or sliding. In stick mode or static friction mode, the tangential force vector $f_1$, which lies in a plane tangential to the normal force of contact, the force that prevents two objects from interpenetrating, must have smaller magnitude than the friction coefficient $\mu_s$ times the magnitude of the normal force $f_n$ i.e., $$\|f_t\| = \sqrt{f_{t1}^2 + f_{t2}^2} \leq \mu_s f_n \quad (4.24)$$

where $f_{t1}$ and $f_{t2}$ are components of the tangential force along two perpendicular directions in the tangential plane. In dynamic or sliding friction, the friction force must oppose the sliding velocity vector $v_1$ and its magnitude is the kinetic friction coefficient $\mu_k$ times the normal force i.e.

$$\|f_t\| = \mu_k f_n \quad (4.25)$$

$$f_t \cdot v_t = f_{t1} v_{t1} + f_{t2} v_{t2} \leq 0 \quad (4.26)$$

This model does not specify how to compute $f_n$ or $f_t$ at all but only states relationships between those quantities. These conditions specify that the tangential force should lie in the convex cone defined by the normal force, i.e., $$C_{(fn)} = \{f_n + f_t \mid \|f_t\| < \mu_s f_n\} \quad (4.27)$$

The first approximation we perform on this is to replace the friction cone by a friction pyramid, a simple case of polygonal cone approximation found in the literature. The idea is to introduce k linearly dependent basis vectors for the contact plane denoted $d_1, d_2, \ldots$, and to represent the tangential friction force as:

$$f_t = \sum_i d_i \beta_i \quad (4.28)$$

and from this definition, we get an approximation to the friction cone known as the friction polyhedron:

$$C_{(fn)} = \left\{ f_n + \sum_i d_i \beta_i \,\middle|\, 0 < \beta_i < \mu_s \|f_n\| \right\} \quad (4.29)$$

The construction is shown for the friction pyramid in FIG. 4 using four basis vectors with equal angular spacing.

The final approximation is to neglect the dependence of the tangential friction forces on the normal force by specifying an independent maximum value for the coefficients, $f_{max}$. This gives a simple approximation off the friction cone that we refer to as a 'box friction' model.

$$B_{(fn)} = \left\{ f_n + \sum_i d_i \beta \,\middle|\, 0 < \beta_i < f_{max} \right\} \quad (4.30)$$

A box friction approximation to the friction cone is shown in FIG. 5.

The invention claimed is:

1. A computer-implemented method, using a computer having at least a processing unit and a memory, for determining motion of simulated objects each of which is represented by a data structure indicating characteristics of the simulated object, wherein each of at least some of the simulated objects have visual characteristics and simulated physical characteristics and wherein the motion of the simulated objects is to be in compliance with a physics model and is to be represented on a display device such that a viewer perceives the motion of the simulated objects in compliance with the physics model, the method comprising:

storing, in the memory, position parameters and velocity parameters, the position and velocity parameters defining an initial state of the physics model and the simulated objects;

storing, in the memory, constraint parameters defining at least one constraint function constraining the motion of the simulated objects according to the physics model, wherein the constraint parameters include at least one position constraint constraining the motion of the plurality of rigid bodies;

calculating, using the processor, the position and velocity parameters defining the state of the simulated objects after a predetermined time step based on rigid body dynamics, including:

a) carrying out a semi-implicit integration step subject to the constraints constraining the motion of the simulated objects, to determine the velocity after the step; and b) determining constraint forces that act to keep the simulated objects in compliance with the constraints by ensuring that the first derivative of the constraint function is zero;

generating, using the processor, at the end of the predetermined time step, a screen image of a series of screen images for display on the display device, the screen image displaying a view of the simulated objects such that the viewer can perceive the motion of the simulated objects in compliance with the physics model, the screen image being based on the calculated position and velocity parameters defining the state of the simulated objects at the end of the predetermined time step; and displaying the screen image on the display device;

wherein the physics model includes a model of friction in which the frictional force between a pair of objects is independent of a normal force between the objects for both elastic and inelastic collisions.

2. The method of claim 1, further comprising before the step of calculating in the processor the position and velocity parameters, a step of:

storing in the memory parameters defining a bounded constraint force to simulate the effects of friction in which the constraint force acts in the plane of contact between a pair of objects to prevent sliding of one of the pair of objects over the other of the pair, wherein the constraint force is bounded to be not greater than a predetermined constant value to allow sliding of the objects over one another and thus include dynamic friction in the simulation.

3. A method according to claim 1 wherein the calculating step includes carrying out the implicit integration by:

calculating the velocity parameters after the time step from the external forces, the constraint forces and the position and velocity parameters before the time step, and calculating the position parameters after the time step from the external forces and constraint forces, the calculated velocity parameters after the time step and the position parameters before the time step.

4. A method according to claim 1 wherein the frictional force between a pair of objects is modelled as a bounded constraint force in which the constraint force acts in the plane of contact between the pair of objects to prevent sliding of one of the pair of objects over the other of the pair, wherein the constraint force is bounded to be not greater than a predetermined constant value to allow sliding of the objects over one another and thus include dynamic friction in the simulation.

5. A method according to claim 1 wherein the bounds on the constraint forces are included by a step of testing whether the constraint forces have a magnitude greater than a predetermined value and if so setting them to be that predetermined value.

6. A method of generating a display in a computer game according to claim 1.

7. A method according to claim 1, wherein the constraint forces are determined by solving the mixed linear complementarity problem using a Murty algorithm.

8. A method according to claim 5 wherein the linear complementarity problem is solved by solving the boxed LCP problem by the boxed Murty's method.

9. A method according to claim 7 wherein the constraints are required to be held to within a predetermined tolerance $\epsilon$.

10. A method according to claim 9 where $\epsilon$ has a value between $10^{-4}$ and $10^{-2}$.

11. A method according to claim 1, in which the constraints are modelled using the first order expansion of the constraint function $\Phi$, such that $\Phi = \phi_o + J_p(p'-p) = (1-\gamma)\phi_o$, where $\gamma$ is a relaxation parameter, $\phi_o$ is a constraint, $J_p$ is the Jacobian of the constraint forces based on position, p' is a position parameter after the predetermined timestep, and p is a position parameter before the predetermined timestep.

12. A method according to claim 11 wherein $\gamma$ and a predetermined tolerance $\epsilon$ on the constraints are chosen to model a compliant coupling between two of the rigid bodies.

13. A computer readable medium storing a plurality of program code for controlling a data processor of a computer system, that when executed, cause the data processor to perform one or more tasks for simulating the motion of objects and displaying the results on a display screen, the computer system including a memory having memory locations for position parameters and for velocity parameters, the position and velocity parameters defining an initial state of a model system having a plurality of bodies, the plurality program code comprising:

program code for storing, in the memory, constraint parameters defining at least one constraint function constraining the motion of the bodies in the model system, wherein the constraint parameters include at least one position constraint constraining the motion of the plurality of rigid bodies;

program code for calculating the position and velocity parameters defining the state of the system after a predetermined time step based on rigid body dynamics, including:

a) program code for performing a semi-implicit integration step subject to the constraints constraining the motion of the simulated objects to determine the velocity after the step; and b) program code for determining constraint forces that act to keep the system in compliance with the constraints by ensuring that the first derivative of the constraint function is zero; and program code for generating, at the end of the predetermined time step, a screen image of a series of screen images for display on the display screen, the screen image displaying a view of the simulated objects such that the viewer can perceive the motion of the simulated objects in compliance with the physics model, the screen image being based on the calculated position and velocity parameters defining the state of the simulated objects at the end of the predetermined time step; and program code for displaying the screen image on the display screen, wherein the model system includes a model of friction in which the frictional force between a pair of objects is independent of a normal force between the objects for both elastic and inelastic collisions.

14. The computer readable medium of claim 13, wherein the data carrier is a cartridge for a computer game machine.

15. The computer readable medium of claim 13, wherein the semi-implicit integration step comprises:

program code for calculating the velocity parameters after the time step from external forces, the constraint forces and the position and velocity parameters before the time step, and program code for calculating the position parameters after the time step from the external forces and constraint forces, the calculated velocity parameters after the time step and the position parameters before the time step each according to the constraints.

16. Apparatus for simulating the motion of objects and displaying the results on a display screen comprising:

a display screen, a memory, a processing unit, and a computer program stored in the memory for causing the apparatus to carry out the steps of:

a) storing in the memory position and velocity parameters defining an initial state of a model system having a plurality of bodies, b) storing in the memory parameters defining at least one constraint function constraining the motion of the bodies in the model system, wherein the at least one constraint function defines at least one position constraint constraining the motion of the plurality of rigid bodies, c) storing in the memory parameters defining a bounded constraint force to simulate the effects of friction in which the constraint force acts in the plane of contact between a pair of objects to prevent sliding of one of the pair of objects over the other of the pair, wherein the constraint force is bounded to be not greater than a predetermined constant value to allow sliding of the objects over one another and thus include dynamic friction in the simulation, and wherein the bounded constraint force is independent of a normal force between the objects for both elastic and inelastic collisions;

d) calculating in the processor the position and velocity parameters defining the state of the system after a predetermined time step based on rigid body dynamics, including i) carrying out a semi-implicit integration step subject to the constraints, to determine the velocity after the step; and ii) determining the constraint forces that act to keep the system in compliance with the constraints by ensuring that the first derivative of the constraint function is zero; and e) generating, at the end of the predetermined time step, a screen image of a series of screen images for display on the display screen, the screen image displaying a view of the simulated objects such that the viewer can perceive the motion of the simulated objects in compliance with the physics model, the screen image being based on the calculated position and velocity parameters defining the state of the simulated objects at the end of the predetermined time step, and f) displaying, on the display screen, the screen image.

17. A computer-implemented method, using a computer, for simulating movement of a plurality of rigid bodies according to a physics model by calculating motion of the plurality of the rigid bodies the method comprising:

storing, into storage accessible to the computer, position parameters defining initial positions of a plurality of rigid bodies;

defining at least one position constraint constraining the motion of the plurality of rigid bodies, the at least one position constraint defining constraints on positions of the plurality of rigid bodies represented by the position parameters read from the storage;

providing the at least one position constraint to the computer;

determining a bounded constraint force, using the computer, wherein the bounded constraint force represents a frictional force between a pair of objects of the plurality of rigid bodies, the frictional force acting in a plane of contact between the pair of objects and wherein at least one reaction force is bounded to be not greater than a predetermined value relative to the frictional force, and wherein the bounded constraint force is independent of a normal force between the objects for both elastic and inelastic collisions;

calculating, using the computer, new position parameters for the plurality of rigid bodies using the computer, the new position parameters defining new positions of the plurality of rigid bodies after a predetermined time step, wherein the new position parameters depend on at least one reaction force that acts to keep the plurality of rigid bodies in compliance with the at least one position constraint, such that the new position parameters satisfy the at least one position constraint directly without an iterative error process; and generating, using the processor, at the end of the predetermined time step, a screen image of a series of screen images for display on a display device, the screen image displaying a view of the simulated objects such that the viewer can perceive the motion of the simulated objects in compliance with the physics model, the screen image being based on the calculated position and velocity parameters defining the state of the simulated objects at the end of the predetermined time step; and displaying the screen image on the display device.

18. The method according to claim 17, further comprising constraining at least one reaction force to not exceed a predetermined value by setting the at least one reaction force equal to the predetermined value if it would exceed the predetermined value.

19. The method according to claim 17, further comprising displaying an image of the plurality of rigid bodies at their calculated positions on a display.

20. The method according to claim 17, further comprising:
storing, into the storage, velocity parameters defining initial velocities of the plurality of rigid bodies;
defining at least one combined constraint constraining the motion of the plurality of rigid bodies, the at least one combined constraint defining constraints on velocities and positions of the plurality of rigid bodies represented by the velocity parameters and position parameters read from the storage;
providing the at least one combined constraint to the computer, and
wherein calculating the new position parameters depends on at least one reaction force that acts to keep the plurality of rigid bodies in compliance with the at least one position constraint and the at least one combined constraint.

21. The method according to claim 20, further comprising storing, into the storage, force parameters defining at least one initial force acting on the plurality of rigid bodies, and wherein the at least one constraint further includes constraints on the positions of the plurality of rigid bodies that depend upon the stored position parameters, the velocity parameters and the force parameters read from the storage.

22. The method according to claim 20, further comprising calculating new velocity parameters for the plurality of rigid bodies defining new velocities of the plurality of rigid bodies after the predetermined time step.

23. A computer system comprising a processor and instruction memory, the instruction memory comprising instructions that, when executed, calculate simulated movement of a plurality of rigid bodies according to a physics model from stored representations of the plurality of rigid bodies, the computer system comprising:
a data memory configured to store position parameters defining initial positions of the plurality of rigid bodies;
a constraint definer that, when executed, defines at least one position constraint constraining motion of the plurality of rigid bodies, the at least one position constraint defining constraints on positions of the plurality of rigid bodies represented by the stored position parameters read from the storage;
a friction modeler operable to determine a bounded constraint force, wherein the bounded constraint force represents a frictional force between a pair of objects of the plurality of rigid bodies, the frictional force acting in a plane of contact between the pair of objects, wherein at least one reaction force is bounded to be not greater than a predetermined value relative to the frictional force, and wherein the bounded constraint force is independent of a normal force between the objects for both elastic and inelastic collisions; and
a position parameter calculator that, when executed, calculates new position parameters for the plurality of rigid bodies defining new positions of the plurality of rigid bodies after a predetermined time step, wherein the new position parameters depend on at least one reaction force that acts to keep the plurality of rigid bodies in compliance with the at least one position constraint, such that the new position parameters satisfy the at least one position constraint directly without an iterative error process;
a image generator that when executed at the end of the predetermined time step, generates a screen image of a series of screen images for display on a display device, the screen image displaying a view of the simulated objects such that the viewer can perceive the motion of the simulated objects in compliance with the physics model, the screen image being based at least in part on the position parameters for the plurality of rigid bodies at the end of the predetermined time step;
wherein the processor is configured, when executed, to perform processing operations that implement the constraint definer and the position parameter calculator in accordance with computer executable instructions stored in the instruction memory.

24. Computer system according to claim 23, the computer executable instructions stored in the instruction memory further comprising instructions for determining a bounded constraint force, wherein the bounded constraint force represents a frictional force between a pair of objects of the plurality of rigid bodies, the frictional force acting in a plane of contact between the pair of objects and wherein at least one reaction force is bounded to be not greater than a predetermined value relative to the frictional force.

25. Computer system according to claim 23, the computer executable instructions stored in the instruction memory further comprising instructions for constraining at least one reaction force to not exceed a predetermined value by setting the at least one reaction force equal to the predetermined value if it would exceed the predetermined value.

26. Computer system according to claim 23, the computer executable instructions stored in the instruction memory further comprising instructions to generate a display of an image of the plurality of rigid bodies at their calculated positions on a display.

27. Computer system according to claim 23, wherein the data memory is further configured to store velocity parameters defining initial velocities of the plurality of rigid bodies, and wherein the constraint definer configured with the at least one constraint including at least one combined constraint constraining velocities and positions of the plurality of rigid bodies represented by the velocity parameters and position parameters stored in the data memory.

28. Computer system according to claim 27, wherein the data memory is further configured to store force parameters defining at least one initial force acting on the plurality of rigid bodies, and wherein the at least one constraint further includes constraints on the positions of the plurality of rigid bodies that depend upon the stored position parameters, the velocity parameters and the force parameters read from the data memory.

29. Computer system according to claim 27, further comprising a velocity parameter calculator configured to calculate new velocity parameters for the plurality of rigid bodies after the predetermined time step.

30. Computer system according to claim 23, further comprising a reaction force calculator configured to calculate at least one reaction force.

31. Computer system according to claim 30, wherein the reaction force calculator is configured, when executed, to calculate the at least one reaction force to not exceed a predetermined value by setting the at least one reaction force equal to the predetermined value if it would exceed the predetermined value.

32. Computer system according to claim 23, the computer executable instructions stored in the instruction memory further comprising instructions for defining at least one combined constraint constraining the motion of the plurality of rigid bodies, the at least one combined constraint defining constraints on velocities and positions of the plurality of rigid bodies represented by the velocity parameters and position parameters read from the storage, and for calculating new position parameters for the plurality of rigid bodies defining new positions of the plurality of rigid bodies after a predetermined time step, wherein the new position parameters depend on at least one reaction force that acts to keep the plurality of rigid bodies in compliance with the at least one position constraint and the at least one combined constraint.

33. Computer system according to claim 32, the computer executable instructions stored in the instruction memory further comprising instructions for storing force parameters defining at least one initial force acting on the plurality of rigid bodies and for implementing constraints on the positions of the plurality of rigid bodies that depend upon the stored position parameters, the velocity parameters and the force parameters read from the data memory.

34. Computer system according to claim 32, the computer executable instructions stored in the instruction memory further comprising instructions for calculating new velocity parameters for the plurality of rigid bodies defining new velocities of the plurality of rigid bodies after the predetermined time step.

35. Processing apparatus for calculating simulated movement of a plurality of rigid bodies according to a physics model, the processing apparatus comprising:
  means for storing position parameters defining initial positions of a plurality of rigid bodies;
  means for defining at least one position constraint constraining the motion of the plurality of rigid bodies, the at least one position constraint defining constraints on positions of the plurality of rigid bodies represented by the position parameters read from the means for storing;
  means for determining a bounded constraint force, wherein the bounded constraint force represents a frictional force between a pair of objects of the plurality of rigid bodies, the frictional force acting in a plane of contact between the pair of objects, wherein at least one reaction force is bounded to be not greater than a predetermined value relative to the frictional force, and wherein the bounded constraint force is independent of a normal force between the objects for both elastic and inelastic collisions;
  means for calculating new position parameters for the plurality of rigid bodies defining new positions of the plurality of rigid bodies after a predetermined time step, wherein the new position parameters depend on at least one reaction force that acts to keep the plurality of rigid bodies in compliance with the at least one position constraint, such that the new position parameters satisfy the at least one position constraint directly without an iterative error process; and
  means for generating, at the end of the predetermined time step, a screen image of a series of screen images for display on a display device, the screen image displaying a view of the simulated objects such that the viewer can perceive the motion of the simulated objects in compliance with the physics model, the screen image being based on the calculated position and velocity parameters defining the state of the simulated objects at the end of the predetermined time step; and
  means for displaying the screen image on the display device.

36. A data carrier tangibly embodying a program of machine readable instructions executable by a digital processing apparatus having stored thereon instructions that, when executed, calculate simulated movement of a plurality of rigid bodies according to a physics model, the program comprising:
  program code for storing, into storage accessible to the computer, position parameters defining initial positions of a plurality of rigid bodies;
  program code for defining at least one position constraint constraining the motion of the plurality of rigid bodies, the at least one position constraint defining constraints on positions of the plurality of rigid bodies represented by the position parameters read from the storage;
  program code for determining a bounded constraint force, wherein the bounded constraint force represents a frictional force between a pair of objects of the plurality of rigid bodies, the frictional force acting in a plane of contact between the pair of objects, wherein at least one reaction force is bounded to be not greater than a predetermined value relative to the frictional force, and wherein the bounded constraint force between the pair of objects is independent of a normal force between the objects for both elastic and inelastic collisions;
  program code for calculating new position parameters for the plurality of rigid bodies defining new positions of the plurality of rigid bodies after a predetermined time step, wherein the new position parameters depend on at least one reaction force that acts to keep the plurality of rigid bodies in compliance with the at least one position constraint, such that the new position parameters satisfy the at least one position constraint directly without an iterative error process; and
  program code for generating, at the end of the predetermined time step, a screen image of a series of screen images for display on a display device, the screen image displaying a view of the simulated objects such that the viewer can perceive the motion of the simulated objects in compliance with the physics model, the screen image being based on the calculated position and velocity parameters defining the state of the simulated objects at the end of the predetermined time step; and program code for displaying the screen image on the display device.

37. The data carrier tangibly embodying a program of machine readable instructions according to claim 36, further comprising program code for constraining at least one reaction force to not exceed a predetermined value by setting the at least one reaction force equal to the predetermined value if it would exceed the predetermined value.

38. The data carrier tangibly embodying a program of machine readable instructions according to claim 36, further comprising program code for displaying an image of the plurality of rigid bodies at their calculated positions on a display.

39. The data carrier tangibly embodying a program of machine readable instructions according to claim 36, further comprising:

program code for storing, into the storage, velocity parameters defining initial velocities of the plurality of rigid bodies;

program code for defining at least one combined constraint constraining the motion of the plurality of rigid bodies, the at least one combined constraint defining constraints on velocities and positions of the plurality of rigid bodies represented by the velocity parameters and position parameters read from the storage; and program code for calculating new position parameters for the plurality of rigid bodies defining new positions of the plurality of rigid bodies after a predetermined time step, wherein the new position parameters depend on at least one reaction force that acts to keep the plurality of rigid bodies in compliance with the at least one position constraint and the at least one combined constraint.

40. The data carrier tangibly embodying a program of machine readable instructions according to claim 39, further comprising program code for storing, into the storage, force parameters defining at least one initial force acting on the plurality of rigid bodies, and the at least one constraint further includes constraints on the positions of the plurality of rigid bodies that depend upon the stored position parameters, the velocity parameters and the force parameters read from the storage.

41. The data carrier tangibly embodying a program of machine readable instructions according to claim 39, further comprising program code for calculating new velocity parameters for the plurality of rigid bodies defining new velocities of the plurality of rigid bodies after the predetermined time step.

* * * * *

UNITED STATES PATENT AND TRADEMARK OFFICE
CERTIFICATE OF CORRECTION

| | | |
|---|---|---|
| PATENT NO. | : 7,610,182 B2 | Page 1 of 1 |
| APPLICATION NO. | : 10/221051 | |
| DATED | : October 27, 2009 | |
| INVENTOR(S) | : Smith et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 930 days.

Signed and Sealed this

Twelfth Day of October, 2010

David J. Kappos
*Director of the United States Patent and Trademark Office*